(12) United States Patent
Hall et al.

(10) Patent No.: US 9,986,102 B1
(45) Date of Patent: May 29, 2018

(54) REMOTE ACTUATION SAFETY

(71) Applicants: David R. Hall, Provo, UT (US);
Jerome Miles, Spanish Fork, UT (US);
Jedediah Knight, Provo, UT (US); Joe Fox, Spanish Fork, UT (US)

(72) Inventors: David R. Hall, Provo, UT (US);
Jerome Miles, Spanish Fork, UT (US);
Jedediah Knight, Provo, UT (US); Joe Fox, Spanish Fork, UT (US)

( * ) Notice: Subject to any disclaimer, the term of this patent is extended or adjusted under 35 U.S.C. 154(b) by 0 days. days.

(21) Appl. No.: 15/595,120

(22) Filed: May 15, 2017

(51) Int. Cl.
| | |
|---|---|
| *H04M 11/00* | (2006.01) |
| *H04B 17/318* | (2015.01) |
| *H04W 4/00* | (2018.01) |
| *H04B 7/0404* | (2017.01) |
| *H04L 12/24* | (2006.01) |

(52) U.S. Cl.
CPC ........ *H04M 11/007* (2013.01); *H04B 7/0404* (2013.01); *H04B 17/318* (2015.01); *H04L 41/0631* (2013.01); *H04W 4/008* (2013.01); *H04W 4/80* (2018.02); *H04M 2250/10* (2013.01)

(58) Field of Classification Search
CPC ....... G08C 17/02; H04L 67/42; H04B 7/2612; H04M 11/007
See application file for complete search history.

(56) References Cited

U.S. PATENT DOCUMENTS

| | | | | |
|---|---|---|---|---|
| 2004/0215816 | A1* | 10/2004 | Hayes | H04L 12/2803 709/238 |
| 2007/0167138 | A1* | 7/2007 | Bauman | G07C 9/00309 455/41.2 |
| 2015/0065049 | A1* | 3/2015 | Heo | H04B 7/2612 455/41.2 |
| 2015/0081763 | A1* | 3/2015 | Sipola | A61B 5/00 709/203 |
| 2015/0302738 | A1* | 10/2015 | Geerlings | G08C 17/02 340/5.25 |

* cited by examiner

*Primary Examiner* — Myron K Wyche

(57) ABSTRACT

Embodiments of a remotely actuatable device are described herein. Such a device may include an electronically actuatable component, a communications module, and a controller. The communications module may include one or more of a receiver, a transmitter, and a transceiver. The controller may electronically communicate with one or more of the electronically actuatable component and the communications module. The controller may store and execute instructions for a set-signal-strength-threshold mode. The instructions may include: receiving at least three signal strength test signals at irregular intervals over a time span ranging from five seconds to five minutes; determining one or more of a mean signal strength and a mode signal strength of the signal strength test signals; and setting a signal strength threshold based on one or more of the mean signal strength and a mode signal strength.

20 Claims, 20 Drawing Sheets

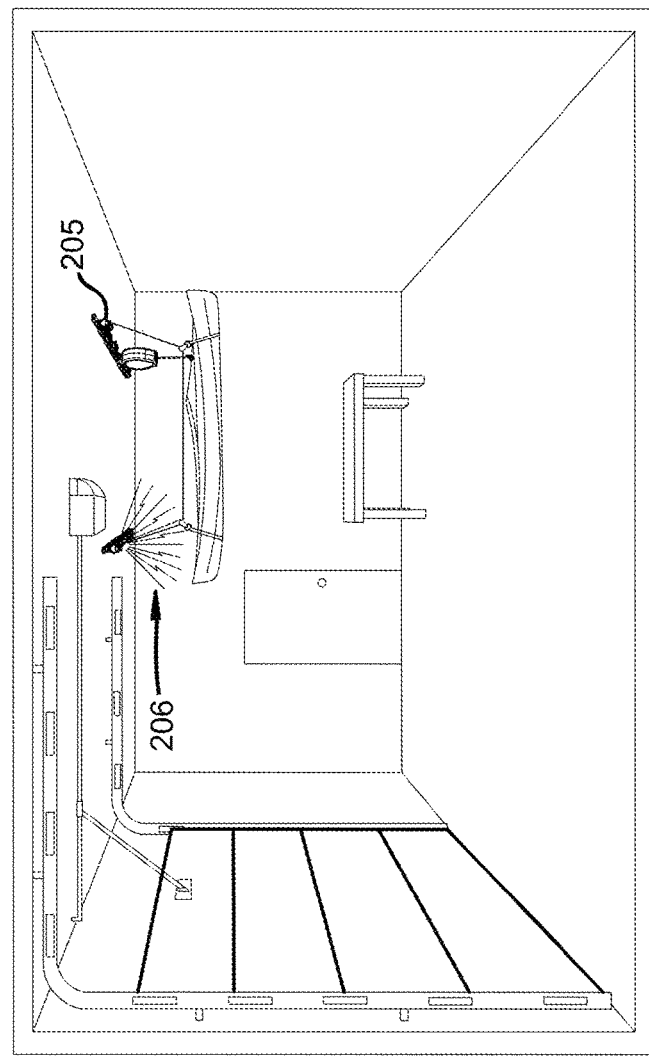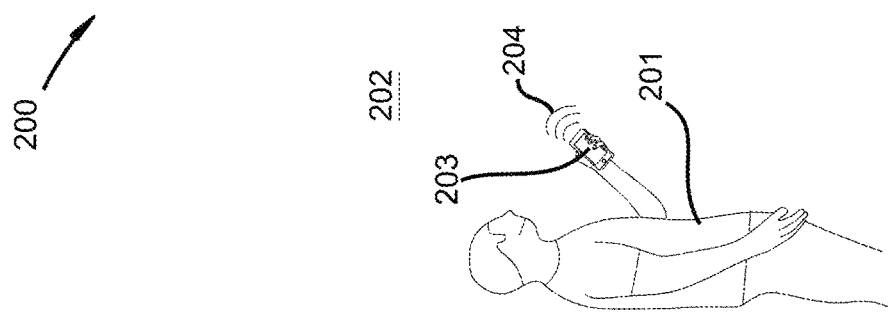
FIG. 2

REMOTE ACTUATION SAFETY

CROSS-REFERENCES

This application makes reference to U.S. patent application Ser. No. 15/487,999 by David Hall et al. for "Overhead Mounting System," U.S. patent application Ser. No. 15/488,860 by David Hall et al. for "Overhead Mounting System for Daisy-Chained Devices," U.S. patent application Ser. No. 15/443,312 by David Hall et al. for "Intelligent Current Limiting to Enable Chaining of DC Appliances," U.S. patent application Ser. No. 15/443,434 by David Hall et al. for "Intelligent Current Limiting to Enable Chaining of AC and DC Appliances," U.S. patent application Ser. No. 15/441,928 by David Hall et al. for "Intelligent Current Limiting to Enable Chaining of AC Appliances," U.S. Patent Publication Number 2015/0284221 to David Hall et al., entitled "Compact Motorized Lifting Device," U.S. patent application Ser. No. 15/413,905 by David Hall et al. for "Wirelessly Controlled Inflator," U.S. patent application Ser. No. 15/434,821 by David Hall et al. for "Inflator with Sound-Proof Housing," and U.S. patent application Ser. No. 15/426,556 by David Hall et al. for "Compact Inflator," each of which are incorporated herein by reference in entirety.

TECHNICAL FIELD

This invention relates generally to the Internet of Things, and more specifically to smart home devices.

BACKGROUND

The proliferation of remotely-controllable smart home devices has led to new problems for users and manufacturers to address. One such problem is remotely controlling a device with moving parts that can injure a person unaware the device is being operated. Some safety certification organizations have started requiring certified devices that are remotely controllable, such as garage doors, to include flashing lights and/or warning sounds when a device is being remotely actuated, such as by a smartphone. However, few if any solutions have attempted a robust solution to determining whether and/or when a device is being remotely operated. Accordingly, there is significant room for improvement to smart home devices.

SUMMARY OF THE INVENTION

Embodiments of a remotely actuatable device are described herein that address at least some of the issues described above. Such a device may include an electronically actuatable component, a communications module, and a controller. The communications module may include one or more of a receiver, a transmitter, and a transceiver. The controller may electronically communicate with one or more of the electronically actuatable component and the communications module. The controller may store and execute instructions for a set-signal-strength-threshold mode. The instructions may include: receiving at least three signal strength test signals at irregular intervals over a time span ranging from five seconds to five minutes, each of the test signals including an indication the test signals were sent from an edge of a line of sight with the remotely actuatable device; determining one or more of a mean signal strength and a mode signal strength of the signal strength test signals; and setting a signal strength threshold based on one or more of the mean signal strength and a mode signal strength. After setting the signal strength threshold, the controller may differentiate between commands sent to the device from within a line of sight and commands sent to the device from outside the line of sight by the signal strength threshold.

In various embodiments, the electronically actuatable component may include a light, a speaker, a laser, a motor, a pump, a power relay, an artificial intelligence processor, a communications router, a battery, or combinations thereof.

In various embodiments, the communications module may include a short-range, 2.4-2.5 GHz transceiver. The set-signal-strength-threshold mode may execute in a pairing mode of the short-range transceiver. The pairing mode may include an initial pairing mode between the remotely actuatable device and a remote control device. The remote control device may include one or more of a smartphone, a tablet, a desktop computer, and a laptop computer. The controller may store instructions for selecting the pairing mode. The instructions may include: receiving a unique remote control device identifier; comparing the identifier to a list of previously-paired device identifiers; entering the initial pairing mode if the unique remote control device identifier does not match any of the previously-paired device identifiers; and entering a normal pairing mode if the unique remote control device identifier matches at least one of the previously-paired device identifiers. The instructions for selecting the pairing mode may additionally/alternatively include receiving an indicator that communicates to the controller directly whether the remote control device has previously paired with the electronically actuatable device. For example, such an indicator may include a true/false statement identifiable by the controller.

In various embodiments, the signal strength test signals may include one or more of a signal order identifier and a time before the next signal strength test signal. The time before the next signal strength test signal may be set to zero for a last signal strength test signal of the at least two signal strength test signals. The last signal strength test signal may include a last-test-signal identifier that directly indicates to the controller no further signal strength test signals will be received.

In various embodiments, the controller may store two or more signal strength thresholds. Each threshold may correspond to a break point in a line-of-sight with the remotely actuatable device. Additionally/alternatively, the signal strength thresholds may correspond to a GPS location of a remote control device that remotely controls the remotely actuatable device.

In various embodiments, the remotely actuatable device may further include at least two antennas electrically connected to the communications module. The communications module may include receivers, transmitters, transceivers, or combinations thereof, corresponding separately to each antenna.

In various embodiments, the controller may further store and execute instructions including: receiving a signal strength test signal location from which the signal strength test signals were sent; and associating the signal strength test signal location with the signal strength threshold. Additionally/alternatively, the controller may store and execute instructions including: receiving a command signal; determining a command signal strength; determining a command signal location from which the command signal was sent; comparing the command signal strength to the signal strength threshold; comparing the command signal location to the signal strength test signal location; and executing instructions delivered by the command signal as the command signal strength exceeds the signal strength threshold.

In various embodiments, the remotely actuatable device may include one or more of a visual alarm comprising one or more lights and an audio alarm comprising one or more speakers. Alternatively, the lights and audio alarm may be incorporated into a separate device in communication with the remotely actuatable device. The controller may store and execute instructions for operating such features, or may store and execute instructions that operate such features in the connected alarm device. The instructions may include: receiving a command signal; determining a command signal strength; determining a command signal location from which the command signal was sent; comparing the command signal strength to the signal strength threshold; comparing the command signal location to the signal strength test signal location; activating one or more of the visual alarm and the audio alarm; and executing instructions delivered by the command signal as the command signal strength is less than the signal strength threshold.

In various embodiments, the controller may further store and execute one or more instructions, including: transmitting the signal strength threshold, the transmission designated for a neighboring device; and receiving and storing a neighboring device signal strength threshold.

BRIEF DESCRIPTION OF THE DRAWINGS

A more particular description of the apparatus summarized above is made below by reference to specific embodiments. Several embodiments are depicted in drawings included with this application, in which:

FIG. 2 depicts an interior view of a garage with a device operator and controller disposed outside the garage;

FIGS. 4A-I depict various remotely actuatable devices;

DETAILED DESCRIPTION

Figure 1:
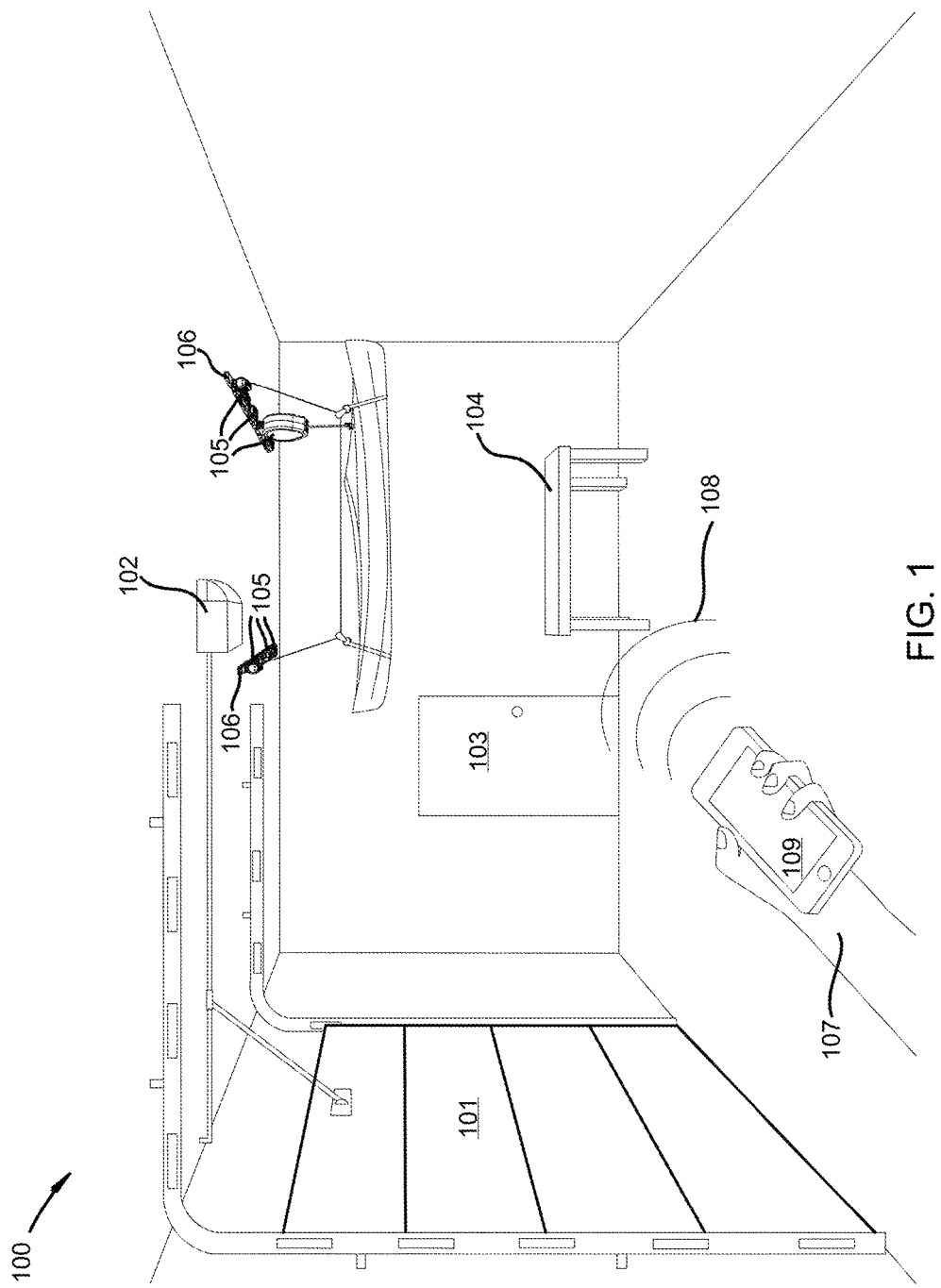
FIG. 1 depicts an interior view of a garage.

A detailed description of embodiments of an apparatus is provided below by example, with reference to embodiments in the appended figures. Those of skill in the art will recognize that the features of the apparatus as described by example in the figures below could be arranged and designed in a wide variety of different configurations. Thus, the detailed description of the embodiments in the figures is merely representative of embodiments of the invention, and is not intended to limit the scope of the invention as claimed.

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a controller and/or microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a cloud based network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arras (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments of a remotely actuatable device are described herein. Such a device may include an electronically actuatable component, a communications module, and a controller. The communications module may include one or more of a receiver, a transmitter, and a transceiver. The controller may electronically communicate with one or more of the electronically actuatable component and the communications module. The controller may store and execute instructions for a set-signal-strength-threshold mode. The instructions may include: receiving at least three signal strength test signals at irregular intervals over a time span ranging from five seconds to five minutes, each of the test signals including an indication the test signals were sent from an edge of a line of sight with the remotely actuatable device; determining one or more of a mean signal strength and a mode signal strength of the signal strength test signals; and setting a signal strength threshold based on one or more of the mean signal strength and a mode signal strength. After setting the signal strength threshold, the controller may differentiate between commands sent to the device from within a line of sight and commands sent to the device from outside the line of sight by the signal strength threshold.

In various embodiments, the electronically actuatable component may include a light, a speaker, a laser, a motor, a pump, a power relay, an artificial intelligence processor, a communications router, a battery, or combinations thereof.

In various embodiments, the communications module may include a short-range, 2.4-2.5 GHz transceiver. The set-signal-strength-threshold mode may execute in a pairing mode of the short-range transceiver. The pairing mode may include an initial pairing mode between the remotely actuatable device and a remote control device. The remote control device may include one or more of a smartphone, a tablet, a desktop computer, and a laptop computer. The controller may store instructions for selecting the pairing mode. The instructions may include: receiving a unique remote control device identifier; comparing the identifier to a list of previously-paired device identifiers; entering the initial pairing mode if the unique remote control device identifier does not match any of the previously-paired device identifiers; and entering a normal pairing mode if the unique remote control device identifier matches at least one of the previously-paired device identifiers. The instructions for selecting the pairing mode may additionally/alternatively include receiving an indicator that communicates to the controller directly whether the remote control device has previously paired with the electronically actuatable device. For example, such an indicator may include a true/false statement identifiable by the controller.

In various embodiments, the signal strength test signals may include one or more of a signal order identifier and a time before the next signal strength test signal. The time before the next signal strength test signal may be set to zero for a last signal strength test signal of the at least two signal strength test signals. The last signal strength test signal may include a last-test-signal identifier that directly indicates to the controller no further signal strength test signals will be received.

In various embodiments, the controller may store two or more signal strength thresholds. Each threshold may correspond to a break point in a line-of-sight with the remotely actuatable device. Additionally/alternatively, the signal strength thresholds may correspond to a GPS location of a remote control device that remotely controls the remotely actuatable device.

In various embodiments, the remotely actuatable device may further include at least two antennas electrically connected to the communications module. The communications module may include receivers, transmitters, transceivers, or combinations thereof, corresponding separately to each antenna.

In various embodiments, the controller may further store and execute instructions including: receiving a signal strength test signal location from which the signal strength test signals were sent; and associating the signal strength test signal location with the signal strength threshold. Additionally/alternatively, the controller may store and execute instructions including: receiving a command signal; determining a command signal strength; determining a command signal location from which the command signal was sent; comparing the command signal strength to the signal strength threshold; comparing the command signal location to the signal strength test signal location; and executing instructions delivered by the command signal as the command signal strength exceeds the signal strength threshold.

In various embodiments, the remotely actuatable device may include one or more of a visual alarm comprising one or more lights and an audio alarm comprising one or more speakers. Alternatively, the lights and audio alarm may be incorporated into a separate device in communication with the remotely actuatable device. The controller may store and execute instructions for operating such features, or may store and execute instructions that operate such features in the connected alarm device. The instructions may include: receiving a command signal; determining a command signal strength; determining a command signal location from which the command signal was sent; comparing the command signal strength to the signal strength threshold; comparing the command signal location to the signal strength test signal location; activating one or more of the visual alarm and the audio alarm; and executing instructions delivered by the command signal as the command signal strength is less than the signal strength threshold.

In various embodiments, the controller may further store and execute one or more instructions, including: transmitting the signal strength threshold, the transmission designated for a neighboring device; and receiving and storing a neighboring device signal strength threshold.

The apparatus generally described above is described below regarding specific embodiments. The detailed description above and below shall not be read to limit the features of the claims; rather, the claims alone describe the outer limits of the invention.

Referring to FIG. 1, a garage 100 is depicted having a garage door 101, a motorized garage door opener 102, and a second door 103. The second door 103 may provide entry from the garage 100 to, for example, a dwelling. The garage 100 includes a workspace 104. Suspended over the workspace 104 are a number of remotely actuatable devices 105 connected to a smart track 106. The garage door opener 102 may also be remotely actuatable. More detailed depictions and descriptions of some such devices are provided below regarding FIGS. 4A-I. The smart track 106 may have various features, such as those depicted in FIGS. 1A-E and described in paragraphs [0015]-[0038] of U.S. patent application Ser. No. 15/487,999 by David Hall et al. for "Overhead Mounting System." The devices 105 may be connected to the smart track 106 by mounting brackets, such as those depicted in FIGS. 4A-9 and described paragraphs [0013]-[0029] and [0033]-[0037] of U.S. patent application Ser. No. 15/488,860 by David Hall et al. for "Overhead Mounting System for Daisy-Chained Devices." The devices 105 may be daisy-chained, such as is depicted in FIGS. 3-6 and 9-15, and described in paragraphs [0039]-[0045] and [0048]-[0063] of U.S. patent application Ser. No. 15/443,312 by David Hall et al. for "Intelligent Current Limiting to Enable Chaining of DC Appliances"; such as is depicted in FIGS. 3-6 and 9-15, and described in paragraphs [0039]-[0045] and [0048]-[0063] of U.S. patent application Ser. No. 15/443,434 by David Hall et al. for "Intelligent Current Limiting to Enable Chaining of AC and DC Appliances"; and/or such as is depicted in FIGS. 3-6 and 9-15, and is described in paragraphs [0039]-[0045] and [0048]-[0063] of U.S. patent application Ser. No. 15/441,928 by David Hall et al. for "Intelligent Current Limiting to Enable Chaining of AC Appliances."

A user 107 may remotely actuate one or more of the devices 105 by sending a wireless signal 108 to the desired device 105 using a remote control device 109. The remote control device depicted is a smartphone. As shown in FIG. 1, the user may be located inside the garage 100 and/or within a line-of-sight of the device 105.

Referring to FIG. 2, a garage 200 is depicted that is similar to the garage 100 depicted in FIG. 1. However, in FIG. 2, a user 201 is disposed outside 202 the garage 200. The user 201 uses a remote control device 203 (depicted as a smartphone) to send a command signal 204 to a remotely actuatable device 205 inside the garage 200. The remotely actuatable device 205, or a separate device electrically connected to the remotely actuatable device 205 and disposed in the garage 200, includes lights and/or speakers that emit visual and/or audio warnings 206. The warnings 206 may notify individuals inside the garage 200 that the device 205 is being remotely operated.

Figure 3:
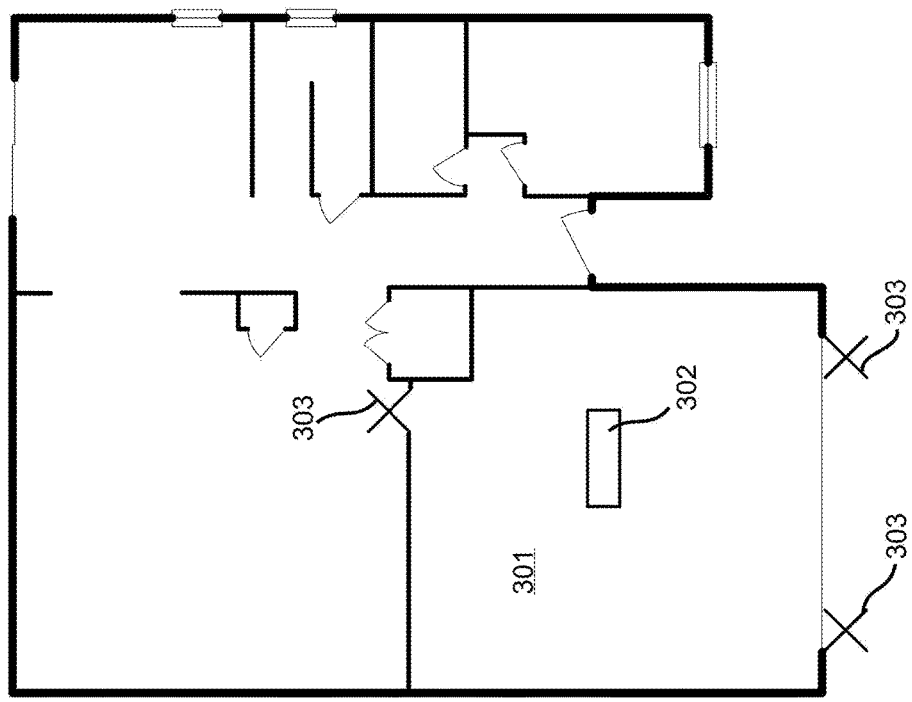
FIG. 3 depicts a plan view of a garage.

Referring to FIG. 3, a plan view 300 of a garage 301 is shown. A remotely actuatable device 302 is disposed within the garage 301. The X's 303 represent areas around the garage where a user may lose a line-of-sight with the remotely actuatable device 302 as the user is facing the device 302. Such areas may represent areas where a user may program the device 302 with a signal strength threshold. The signal strength threshold may represent the lowest signal strength the device 302 may acknowledge for executing a command carried by the signal to the device 302.

Using signal strength to determine approximate range from a device may be optimal for several reasons. First, using signal strength may be optimal over using, for example, a distance-based location, because a user may be out of a line-of-sight with the device while still closer to the device than the closest edge of the line-of-sight. Using a GPS-based system may require a user to digitally trace, such as by walking while GPS tracks the user, the outer edges of the line-of-sight. This may also require a larger amount of data sent with each command, which, depending on the embodiment, may slow down the response time of the device. Using signal strength does not require additional data to be sent with a command because signal strength is calculated at the receiving device, and it tracks more closely with the line-of-sight boundaries because of the significant attenuation caused by obstructions.

Figure 4A:
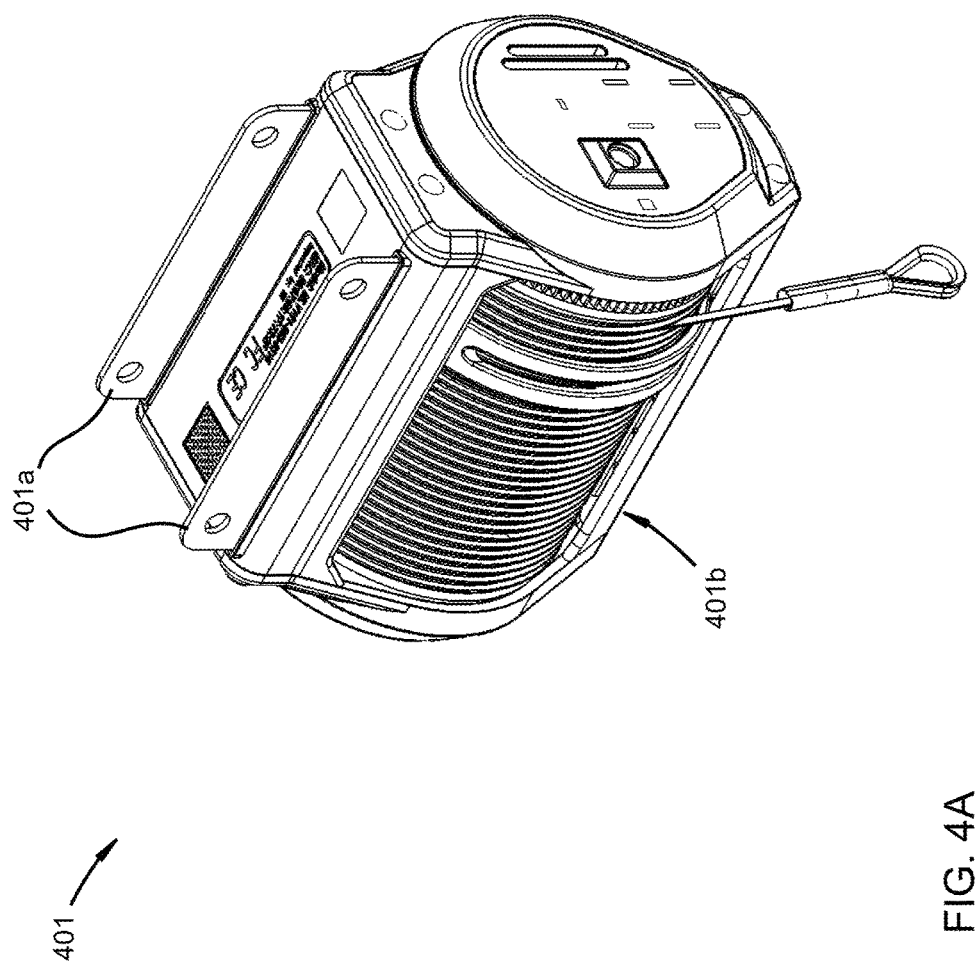

Referring to FIGS. 4A-I, various examples of remotely actuatable devices are depicted. FIG. 4A depicts a compact motorized lifter 401. A more specific description of the lifter 401 is provided in U.S. Patent Publication Number 2015/0284221 to David Hall et al., entitled "Compact Motorized Lifting Device." The lifter 401 includes a mounting bracket 401a that mounts the lifter to a channel or wall mount, such as is described in "Overhead Mounting System for Daisy-Chained Devices." The lifter 401 includes a motor disposed inside a drum 401b, and is controlled remotely by a wireless remote control device, such as a smartphone, a tablet, a laptop, or a desktop computer. The remote control device may also include a server that may store and executes automatic, event-based, and/or time-based instructions without immediate prompting from a user. The server may relay instructions to the remotely actuatable device. The remotely actuatable device may store and execute instructions that activate a warning notification that the device is being remotely controlled.

Figure 4B:
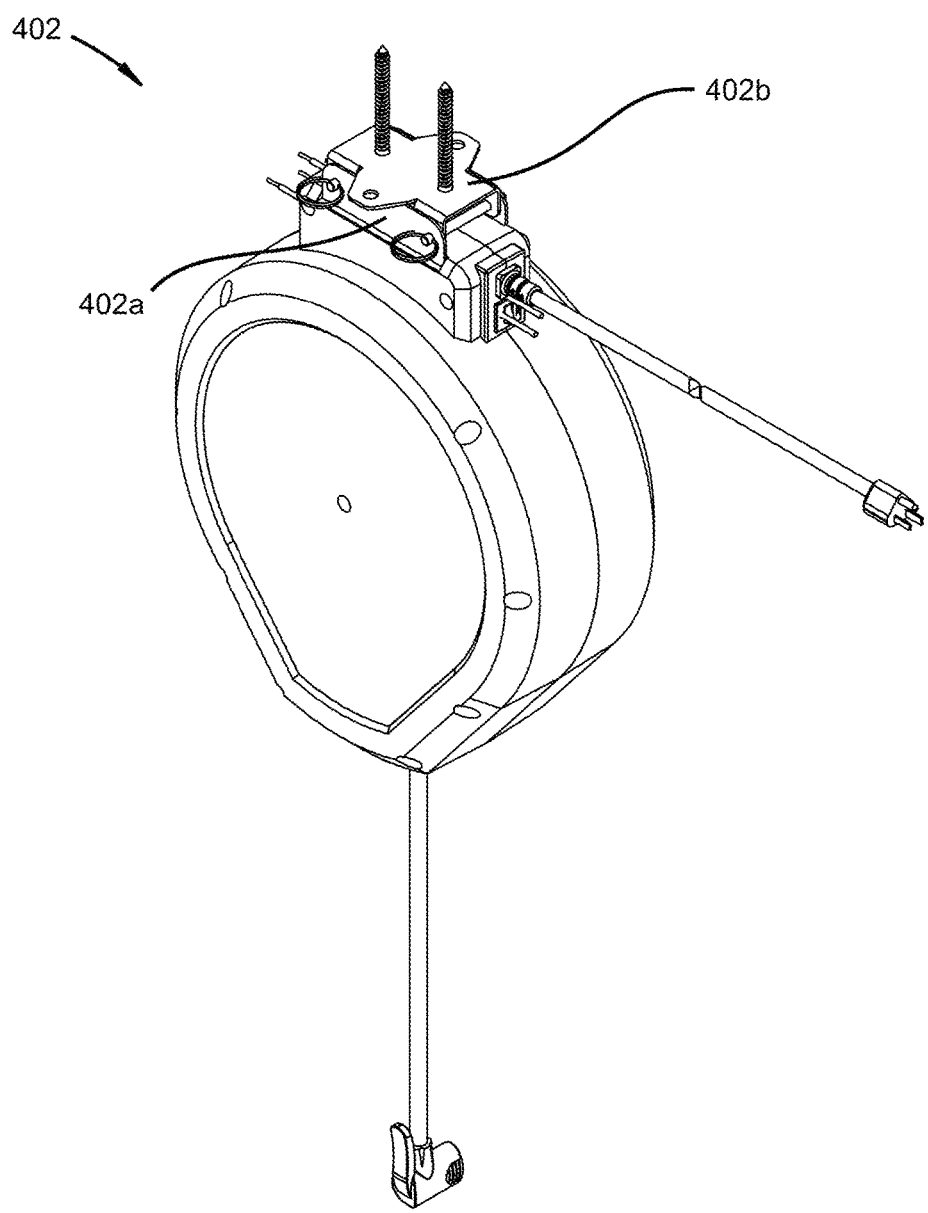

FIG. 4B depicts an overhead-mounted inflator 402. A more specific description of the inflator 402 is provided in U.S. patent application Ser. No. 15/413,905 by David Hall et al. for "Wirelessly Controlled Inflator"; U.S. patent application Ser. No. 15/434,821 by David Hall et al. for "Inflator with Sound-Proof Housing"; and U.S. patent application Ser. No. 15/426,556 by David Hall et al. for "Compact Inflator." The inflator 402 includes a mounting bracket 402a and a wall-mount bracket 402b. Examples of the mounting bracket 402a and the wall-mount bracket 402b are described and depicted in "Overhead Mounting System for Daisy-Chained Devices." The wall-mount bracket 402b mounts directly to a surface, and the mounting bracket 402a mounts directly to the wall-mount bracket 402b. A pump, controller and transceiver are disposed within the inflator 402. The controller is remotely controlled by a remote control device via the transceiver.

Figure 4C:
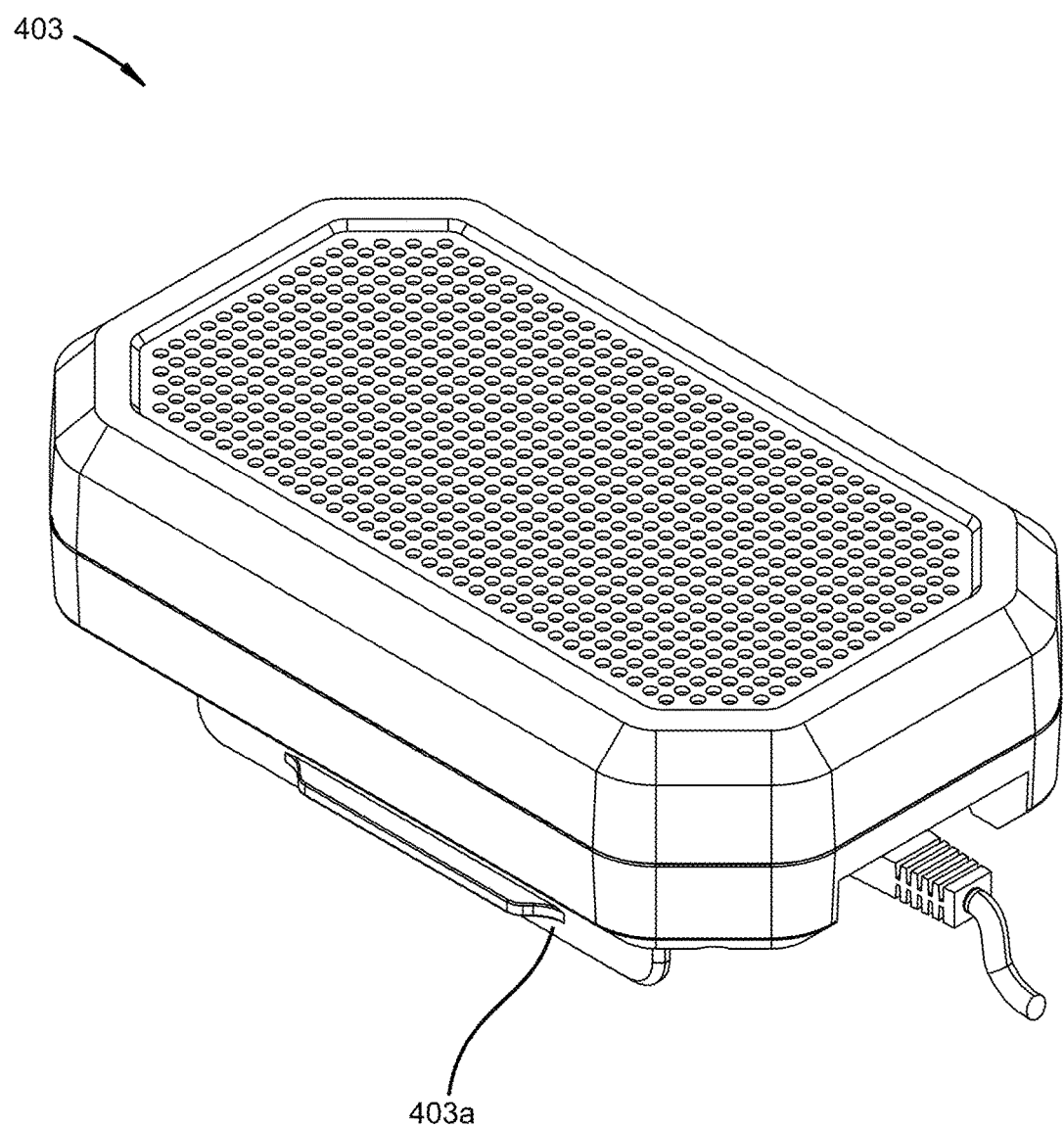

FIG. 4C depicts a Bluetooth speaker 403. The speaker 403 includes a mounting bracket 403a. Examples of the mounting bracket 403a and how the bracket 403a mounts the speaker 403 to a surface are described and depicted in "Overhead Mounting System for Daisy-Chained Devices." The speaker 403 includes a controller and a transceiver within the device. The controller is remotely controlled by a remote control device via the transceiver. Actuation of the speaker 403 may include emitting sounds from the speaker. Some sounds emitted by the speaker may be ultrasonic, and may present a health threat to animals and/or children within earshot. Accordingly, it may be useful to provide a warning before emitting such sounds.

Figure 4D:
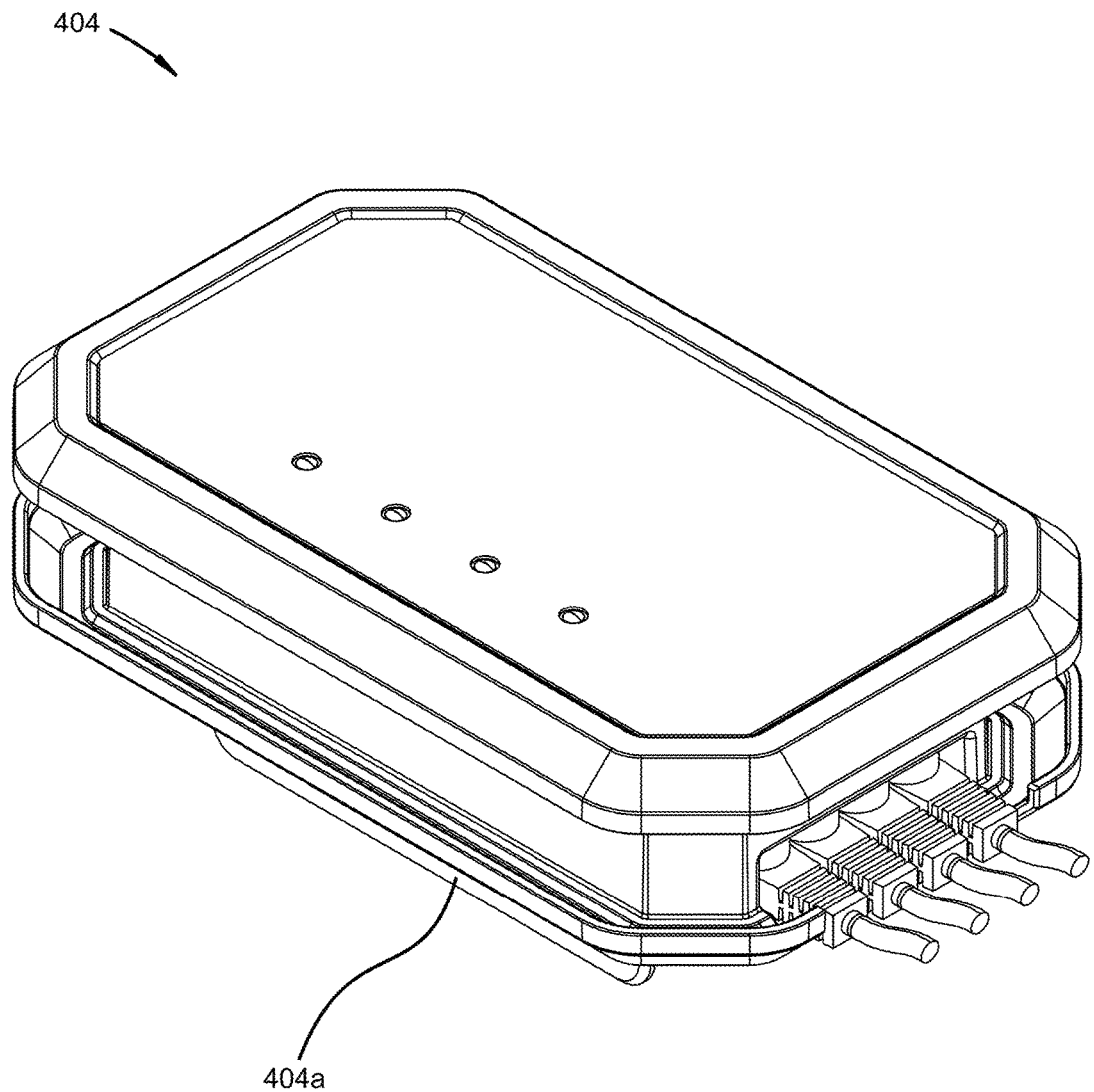

FIG. 4D depicts a battery pack 404. The battery pack 404 includes a mounting bracket 404a. Examples of the mounting bracket 404a and how the bracket 404a mounts the battery pack 404 to a surface are described and depicted in "Overhead Mounting System for Daisy-Chained Devices." The battery pack 404 includes a controller and a transceiver within the device. The controller is remotely controlled by a remote control device via the transceiver. The battery pack 404 may provide a regular supply of DC voltage to one or more devices connected to the battery backup. The battery pack 404 may be rechargeable, and may be connected to mains electricity. Actuation of the battery pack 404 may include switching power from the battery pack 404 off and/or on, throttling the current delivered by the battery pack 404, and/or varying the voltage of the battery pack 404 by switching cells in the battery pack 404 between various configurations of series and parallel.

Figure 4E:
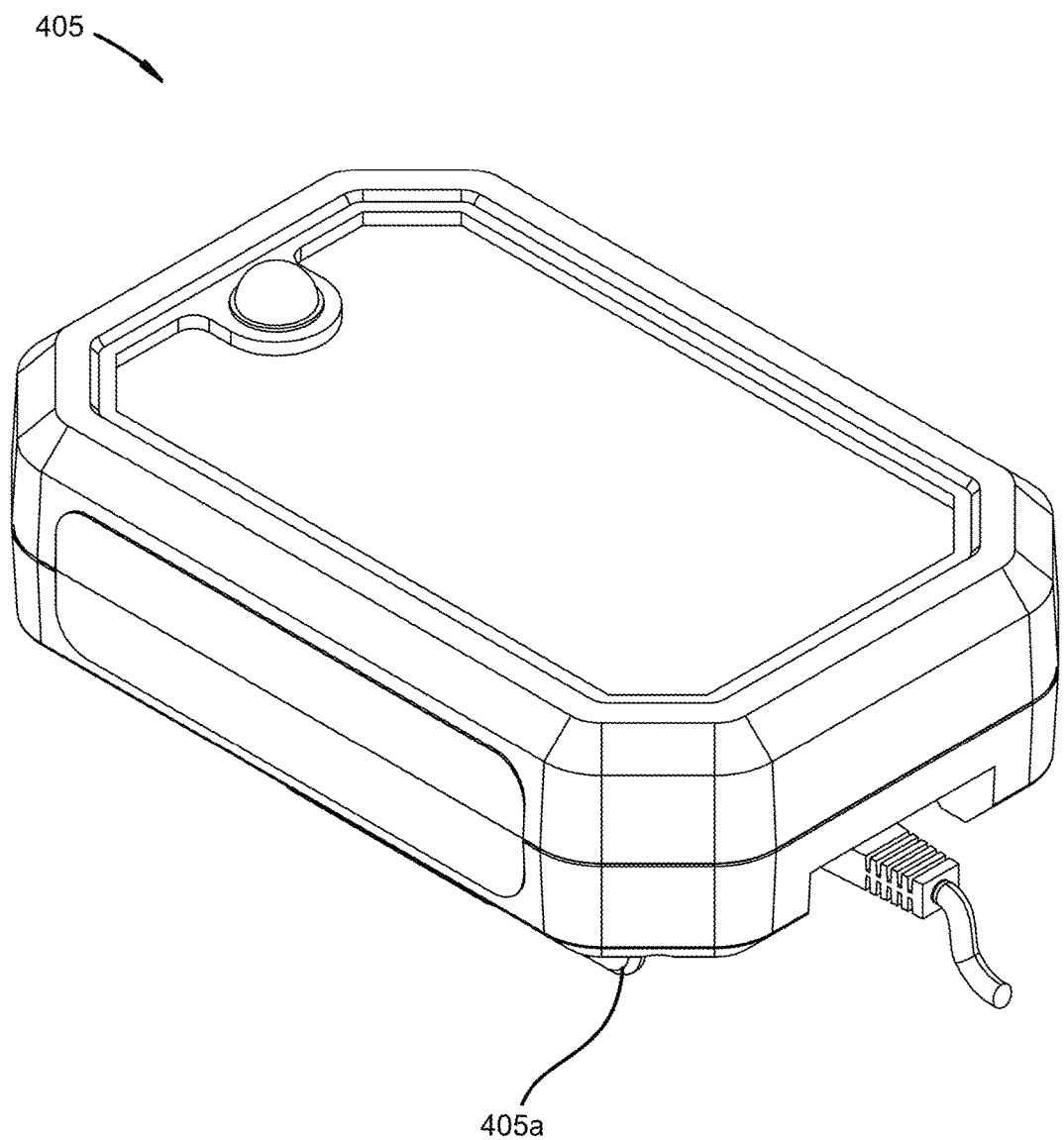

FIG. 4E depicts a light 405. The light 405 includes a mounting bracket 405a. Examples of the mounting bracket 405a and how the bracket 405a mounts the light 405 to a surface are described and depicted in "Overhead Mounting System for Daisy-Chained Devices." The light 405 includes a controller and a transceiver within the device. The controller is remotely controlled by a remote control device via the transceiver. Actuating the light 405 may include switching the light 405 off and/or on, dimming the light 405, and/or activating an automatic lighting program, among others.

Figure 4F:
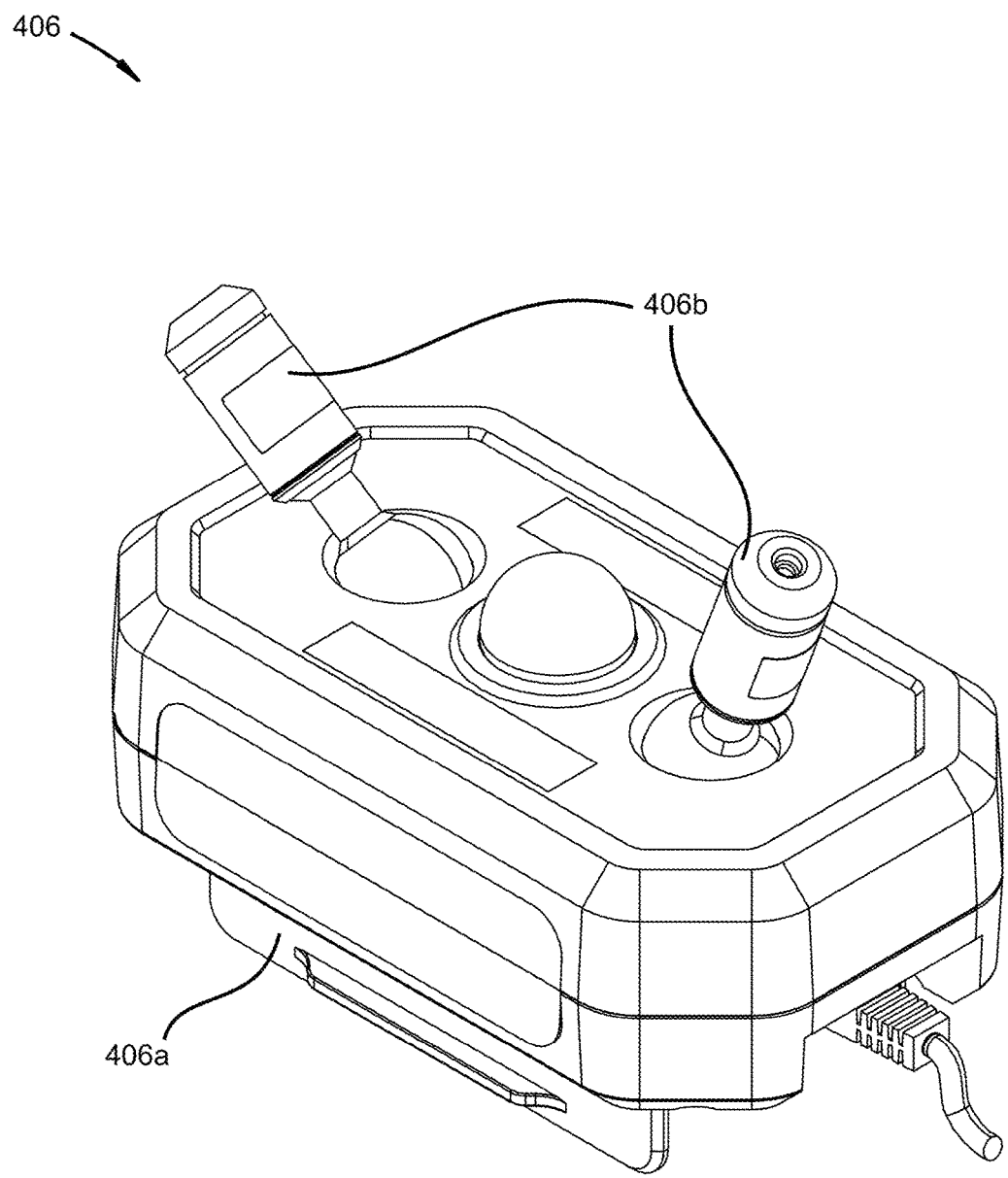

FIG. 4F depicts a laser park-assist 406. The laser park-assist 406 includes a mounting bracket 406a and lasers 406b. Examples of the mounting bracket 406a and how the bracket 406a mounts the laser park-assist 406 to a surface are described and depicted in "Overhead Mounting System for Daisy-Chained Devices." The laser park-assist 406 includes a controller and a transceiver within the device. The controller is remotely controlled by a remote control device via the transceiver. Actuating the laser park-assist 406 may include turning on the lasers 406b. Because of the general dangers associated with operating lasers, notifying individuals in the area that the lasers 406b will be turned on may enhance the safety of remotely operating such devices.

Figure 4G:
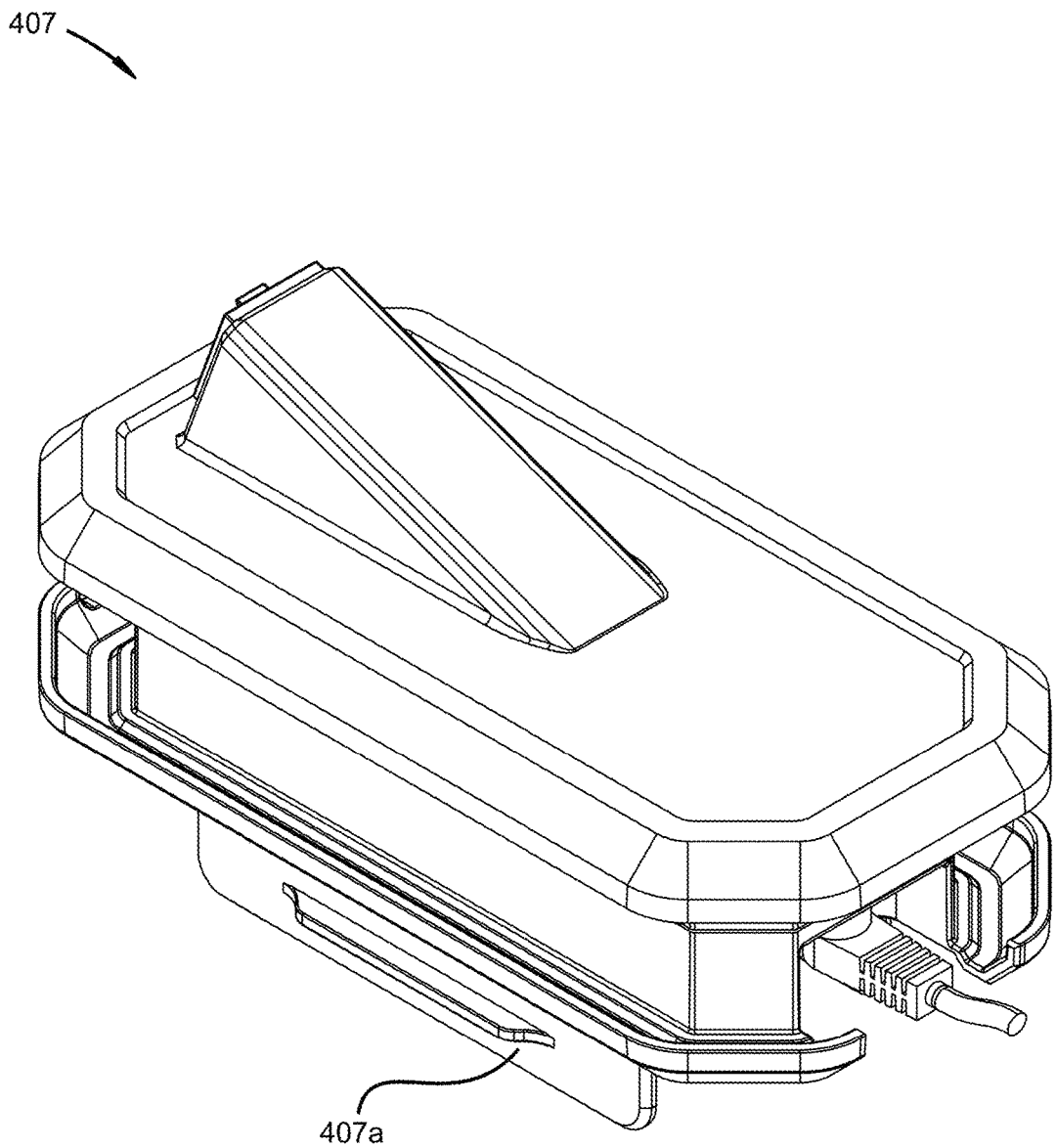

FIG. 4G depicts a power relay 407. The power relay 407 includes a mounting bracket 407a. Examples of the mounting bracket 407a and how the bracket 407a mounts the power relay 407 to a surface are described and depicted in "Overhead Mounting System for Daisy-Chained Devices." The power relay 407 includes a controller and a transceiver within the device. The controller is remotely controlled by a remote control device via the transceiver. Actuating the power relay 407 may include switching the power relay off and/or on, activating one or more transformers, activating a power inverter, and/or activating a rectifier, among others.

Figure 4H:
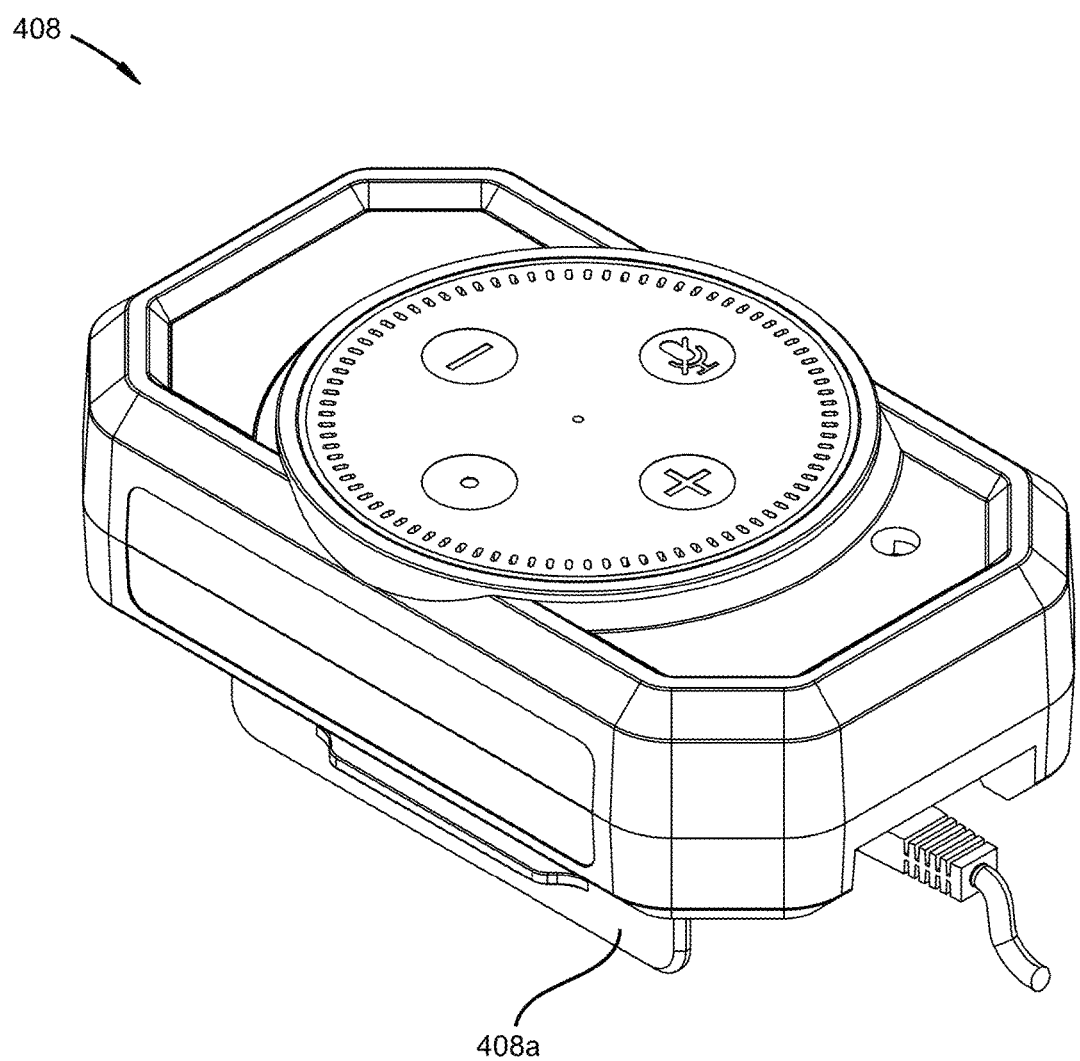
Figure 41:
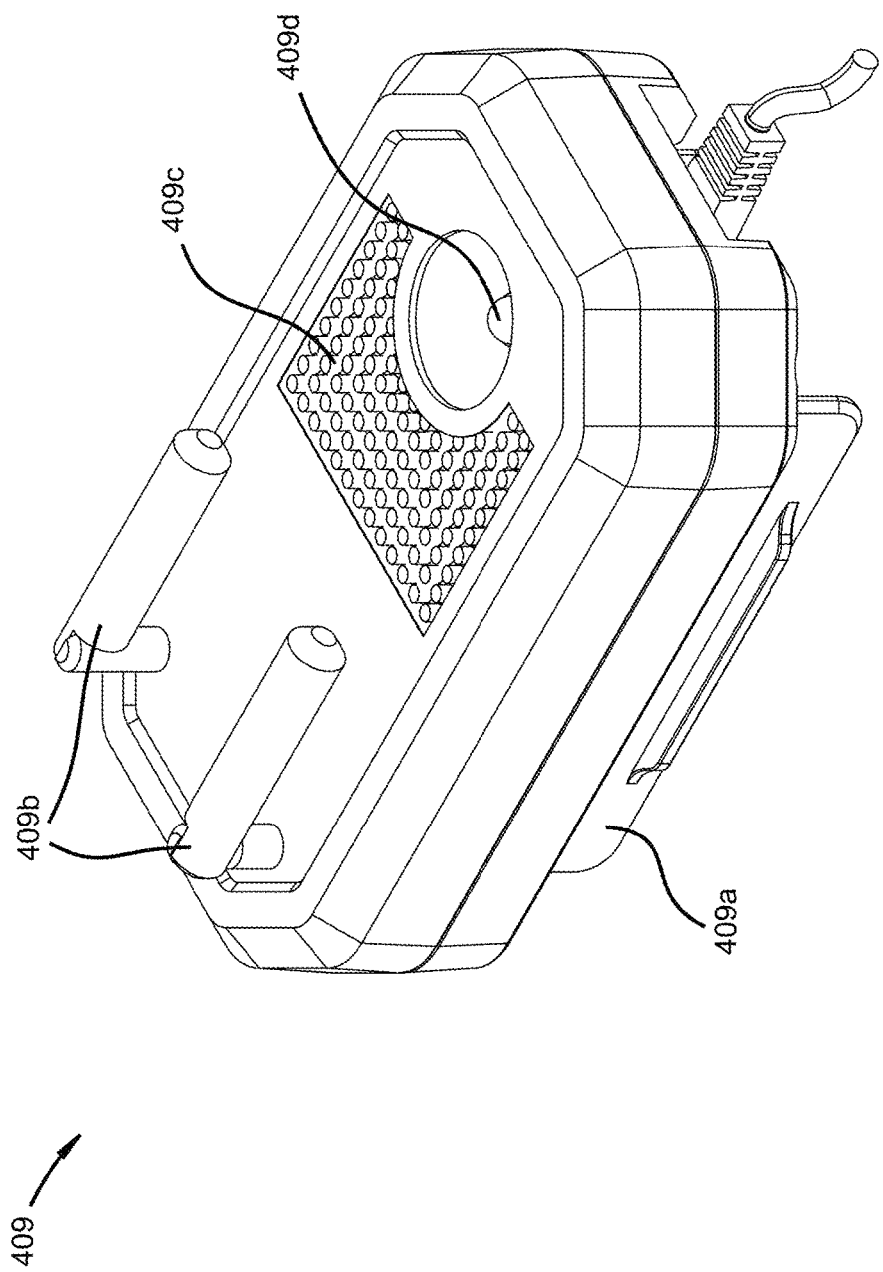

FIG. 4H depicts an artificial intelligence hub 408. The hub 408 includes a mounting bracket 408a. Examples of the mounting bracket 408a and how the bracket 408a mounts the hub 408 to a surface are described and depicted in "Overhead Mounting System for Daisy-Chained Devices." The hub 408 includes a processor, memory, and a transceiver within the device. The processor may be integrated with the memory, such as in a microcontroller, or the memory and the processor may be implemented separately and connected via a PCB. The processor and/or memory is remotely controlled by a remote control device via the transceiver. Actuating the hub 408 may include synchronizing operation of several remotely actuatable devices, among other functions.

FIG. 4I depicts a wifi communications router 409. The router 409 includes a mounting bracket 409a, wireless antennae 409b, a speaker 409c, and a light 409d. Examples of the mounting bracket 409a and how the bracket 409a mounts the router 409 to a surface are described and depicted in "Overhead Mounting System for Daisy-Chained Devices." The router 409 also includes a controller and two transceivers within the device connected to the antennae 409b. The controller is remotely controlled by a remote control device via the transceiver. The first transceiver is a wifi chip that communicates via wifi with one or more remote control devices. The second transceiver is a Bluetooth chip that communicates via Bluetooth with various remotely actuatable devices, such as those described above. As the hub 409 receives an indication a device is to be operated by a user out of a line-of-sight with a connected remotely actuatable device, the hub emits a warning, such as by activating the light 409d and/or emitting a sound from the speaker 409c.

Figure 5A:
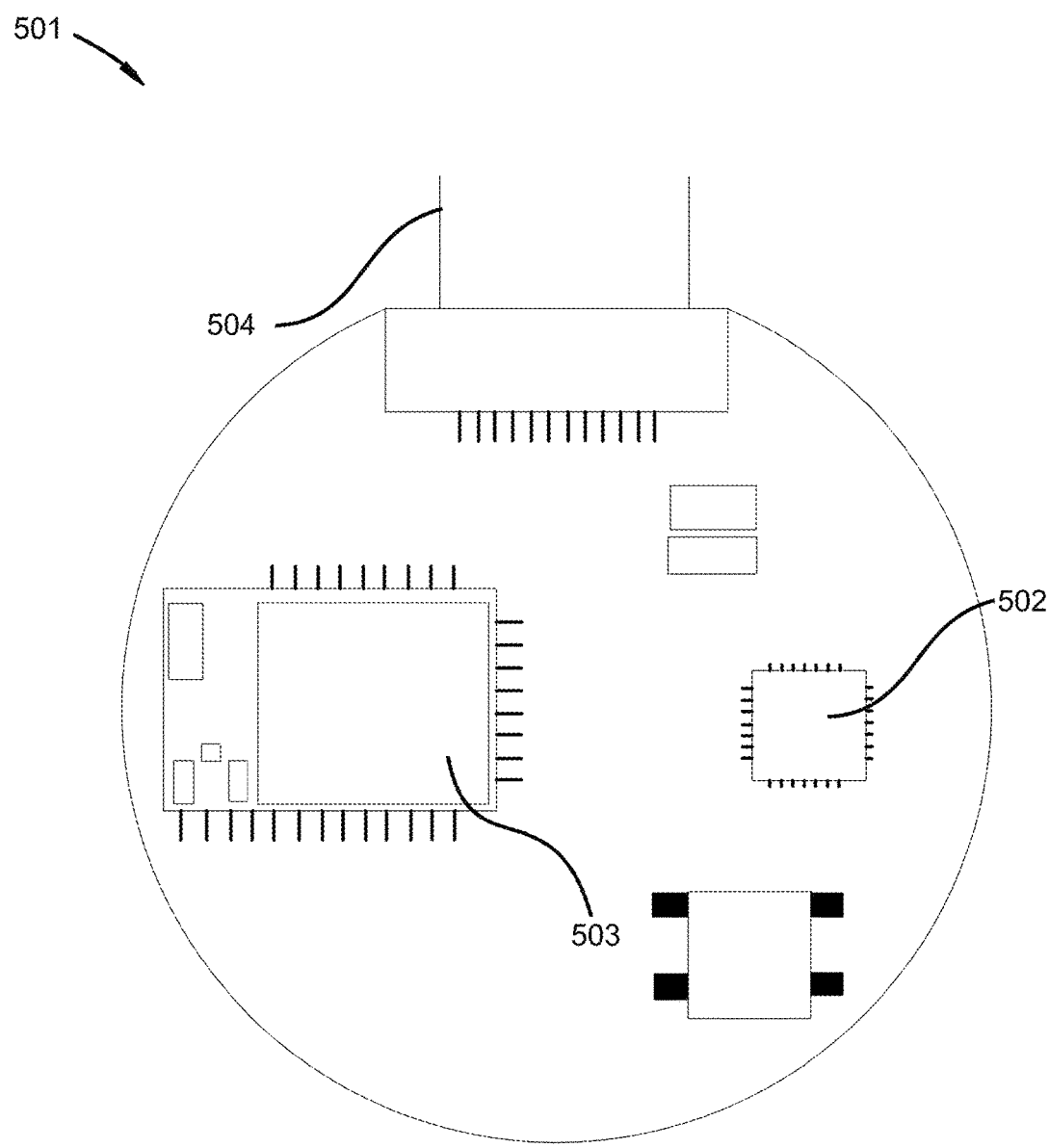
FIGS. 5A-B depict various printed circuit boards for use in a remotely actuatable device.
Figure 5B:
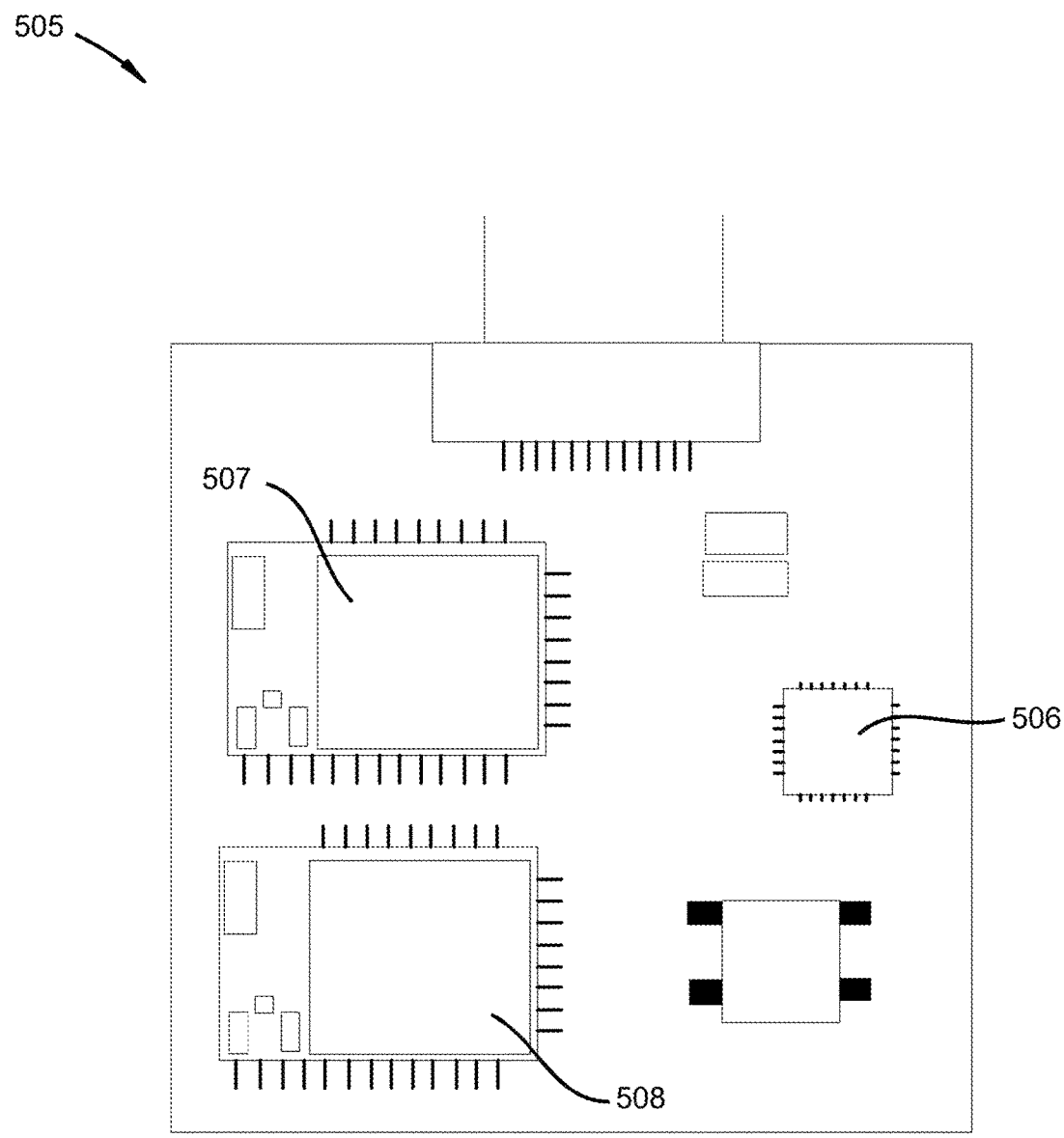

Referring to FIGS. 5A-B, two embodiments of printed circuit boards (PCBs) are shown. FIG. 5A depicts a circular PCB 501, such as may be implemented in a remotely actuatable device having a round profile. The PCB 501 interconnects a microcontroller 502 and a transceiver chip 503. An antenna is integrated into the transceiver chip 503. The microcontroller 502 receives command signals from a remote control device via the transceiver chip 503. The commands may be executed and transmitted to various actuatable components of the remotely actuatable device via a communications ribbon 504. Such components may include, for example, a light, a speaker, a laser, a motor, a pump, a power relay, a battery, or combinations thereof.

FIG. 5B depicts a rectangular PCB 505, such as may be implemented in a remotely actuatable device having a rectangular profile. The PCB 505 interconnects a microcontroller 506, a first transceiver chip 507, and a second transceiver chip 508. Each transceiver chip includes its own antenna. The microcontroller 506 receives command signals from a remote control device via the first transceiver chip 507, the second transceiver chip 508, or both. In some embodiments, the microcontroller 506 may receive the same command signal at both transceivers and determine a location of the remote control device by performing multipath calculations. Performing multipath calculations may be one method of determining a location of a remote control device. However, knowing the location of the device may not provide sufficient insight into the line-of-sight between the remote control device and the remotely actuatable device. Accordingly, utilizing the processing methods described herein may provide better line-of-sight resolution.

Transceivers described herein may communicate using one or more of a variety of wired and/or wireless protocols. Such protocols may include TCP/IP, Ethernet, wi-fi, Bluetooth, LTE, 4G, 3G, WirelssHD, WiGig, Z-Wave, Zigbee, and/or any of a variety of proprietary communications protocols on various ISM bands.

Figure 6:
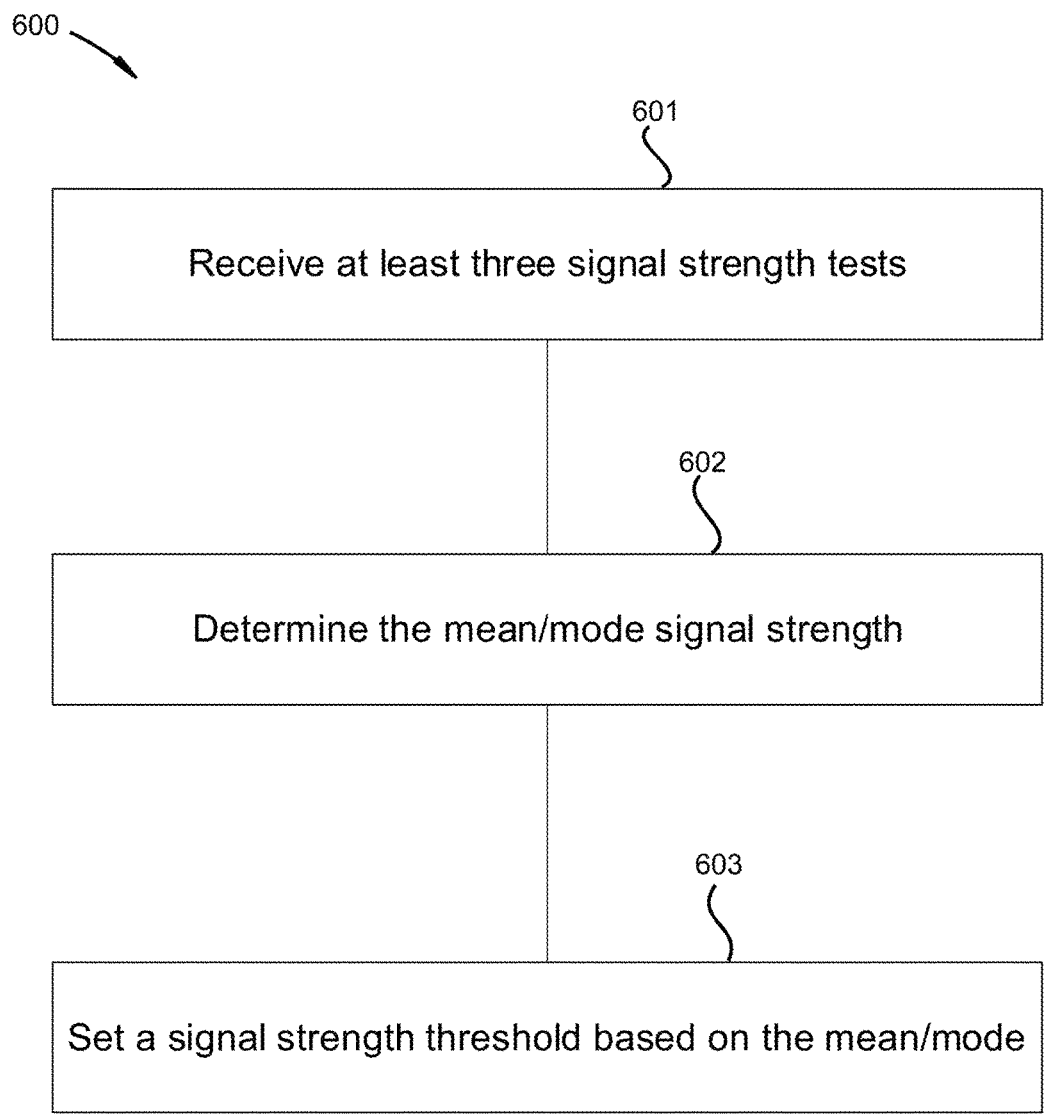
FIG. 6 depicts a set-signal-strength-threshold mode method.

Referring to FIG. 6, a method of executing a set-signal-strength-threshold mode is shown. The method 600 includes, at block 601, receiving at least three signal strength test signals at irregular intervals over a time span ranging from five seconds to five minutes. A device that sends the signal strength test signals may, before sending the test signals, ping the receiving device tens, hundreds, or thousands of times to determine, if any, a signal strength variability pattern. The irregularity of the test signals may be irregular according to the signal strength variability pattern. For example, if the variability is determined to be sinusoidal, irregularity may be accomplished by assigning pseudo-random, non-repeating time increments between test signals. Some variability may arise because of irregular movement of objects/persons within the transmission range of the remotely actuatable device. Accordingly, determining a variability pattern may include isolating one-off variations from regular variations. This may be accomplished, for example, by comparing troughs, peaks and slopes across several time domains and excluding non-repeated features.

At block 602, the method 600 includes determining one or more of a mean signal strength and a mode signal strength of the signal strength test signals. At block 603, the method 600 includes setting a signal strength threshold based on one or more of the mean signal strength and a mode signal strength. The threshold may be equal to the mean and/or mode signal strength, or may be above or below the mean and/or mode. For example, the threshold may be set to 10% below the mean/mode test signal strength, or may be set to 10% above the mean/mode test signal strength.

Signal strength may be determined in any of a variety of ways. In some embodiments, the signal strength may be determined by performing an RSSI calculation on incoming signals. The calculations may be performed on all incoming signals or exclusively test signals. The received signal power may be directly calculated using a known impedance of the antenna and the RMS voltage generated by the received signal. The signal power may then be converted to decibels. Other methods of calculating signal strength may also be employed.

In various embodiments, a remotely actuatable device and an associated remote control device may not know how many test signals to send and/or expect. Accordingly, it may be beneficial to embed such information in the test signals themselves. Thus, in some embodiments, the signal strength test signals may include one or more signal order identifiers and/or a time before the next signal strength test signal. For example, an order identifier may include "1 of 5," "2 of 5," etc. The time before the next signal strength test signal may be set to zero for a last signal strength test signal of the at least three signal strength test signals. A last signal strength test signal of the at least three signal strength test signals may include a last-test-signal identifier that directly indicates to the controller no further signal strength test signals will be received. For example, last-test-signal identifier may be an "end" statement.

Figure 7:
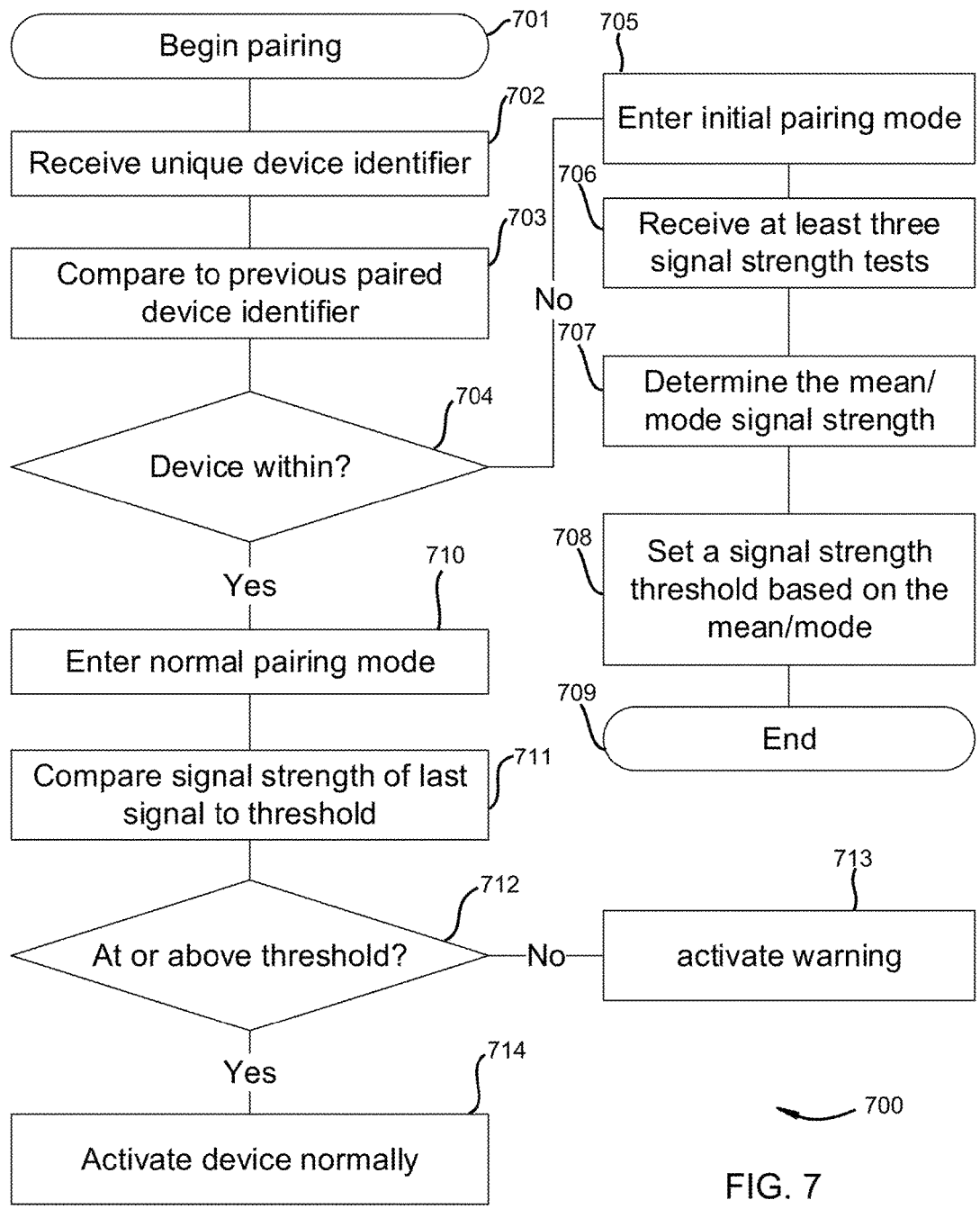
FIG. 7 depicts am example pairing process.

Referring to FIG. 7, an example pairing process is shown. The method 700 includes, at block 701, initiating a pairing sequence between a remote control device and a remotely actuatable device. At block 702, the method 700 includes receiving a unique device identifier. The identifier may be encapsulated in a header of a data packet. Alternatively, the header may contain the device's generic manufacturer's identifier for the specific device, such as a MAC ID, and the unique device identifier may be encapsulated in a payload of the data packet. The unique device identifier may be unique to the local network the device is connected to. For example, the unique device identifier may be user-designated. This may eliminate the need for the MAC ID in the header, and may shorten the length of the overall packet. This may be particularly beneficial in regulated frequency-hopping domains, where the amount of time spent on a particular frequency over a certain period is limited. Having a smaller data packet may reduce the overall time required to transmit the packet.

At block 703, the unique device identifier is compared to previously paired devices. Such may be stored, for example, in the device's hardware memory. At block 704, it is determined whether the unique device identifier is recognized. At block 705, if the device is not recognized, an initial pairing mode is entered. This may include entering a listening mode and waiting for signal strength test signals. At block 706, the method 700 includes receiving at least three signal strength test signals at irregular intervals over a time span ranging from five seconds to five minutes. At block 707, the method 700 includes determining one or more of a mean signal strength and a mode signal strength of the signal strength test signals. At block 708, the method 700 includes setting a signal strength threshold based on one or more of the mean signal strength and a mode signal strength. At block 709, pairing is ended. The device may then exit the pairing mode and enter a normal operation mode.

At block 710, if the unique device identifier is recognized, the method 700 includes entering a regular pairing mode. At block 711, the method 700 includes comparing the signal strength of the last/latest signal to a threshold signal strength corresponding to the paired device. The threshold may, alternatively, be a threshold common to all paired devices. At block 712, it is determined whether the latest signal strength is at or above the threshold. At block 713, if the latest signal strength is not at or above the threshold, the command associated with the latest signal is executed and a warning notification is simultaneously executed. The warning may include lights and/or sounds that notify an individual in physical proximity of the controlled device that the controlled device is being remotely actuated. At block 714, if the latest signal strength is at or above the threshold, the controlled device is activated normally, without executing the warning notification.

Figure 8:
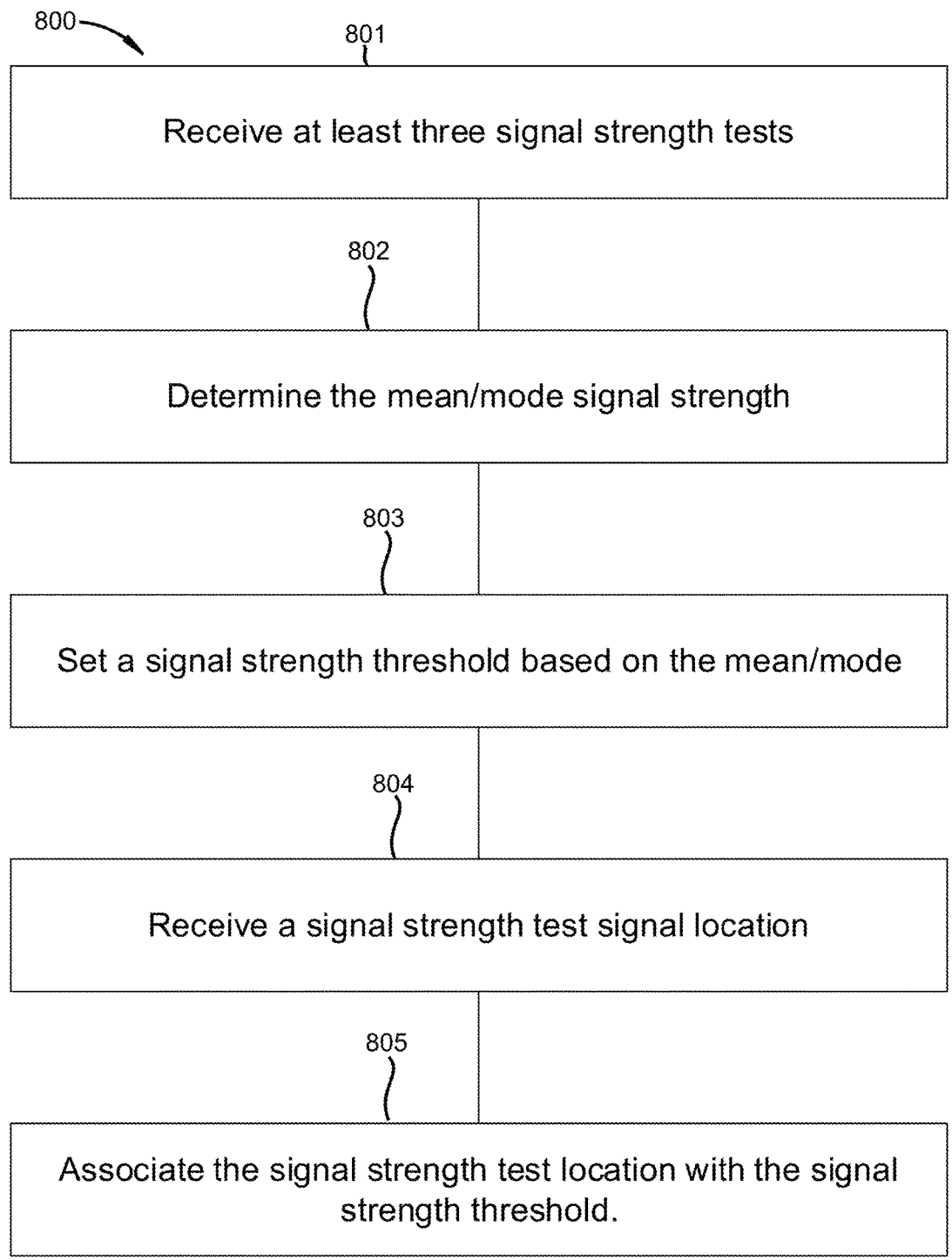
FIG. 8 depicts another method of executing a set-signal-strength-threshold mode.

Referring to FIG. 8, another method of executing a set-signal-strength-mode mode is depicted. In various embodiments, the remotely actuatable device controller may store two or more signal strength thresholds, each threshold corresponding to a break point in a line-of-sight with the remotely actuatable device. The method 800 includes, at block 801, receiving at least three signal strength test signals at irregular intervals over a time span ranging from five seconds to five minutes. At block 802, the method 800 includes determining one or more of a mean signal strength and a mode signal strength of the signal strength test signals. At block 803, the method 800 includes setting a signal strength threshold based on one or more of the mean signal strength and a mode signal strength. At block 804, the method 800 includes receiving a signal strength test signal location from which the signal strength test signals were sent. The location may be, for example, GPS-based or radially-based, and may be encapsulated in the data packet payload. For example, the signal strength thresholds may correspond to a GPS location of a remote control device that remotely controls the remotely actuatable device at the time the test signals were transmitted. At block 805, the method 800 includes associating the signal strength test signal location with the signal strength threshold. The method 800 may be useful for programming common thresholds for multiple remote control devices. The method 800 may also be useful for accounting for variability in signal strengths associated with differing line-of-sight cutoffs.

Figure 9:
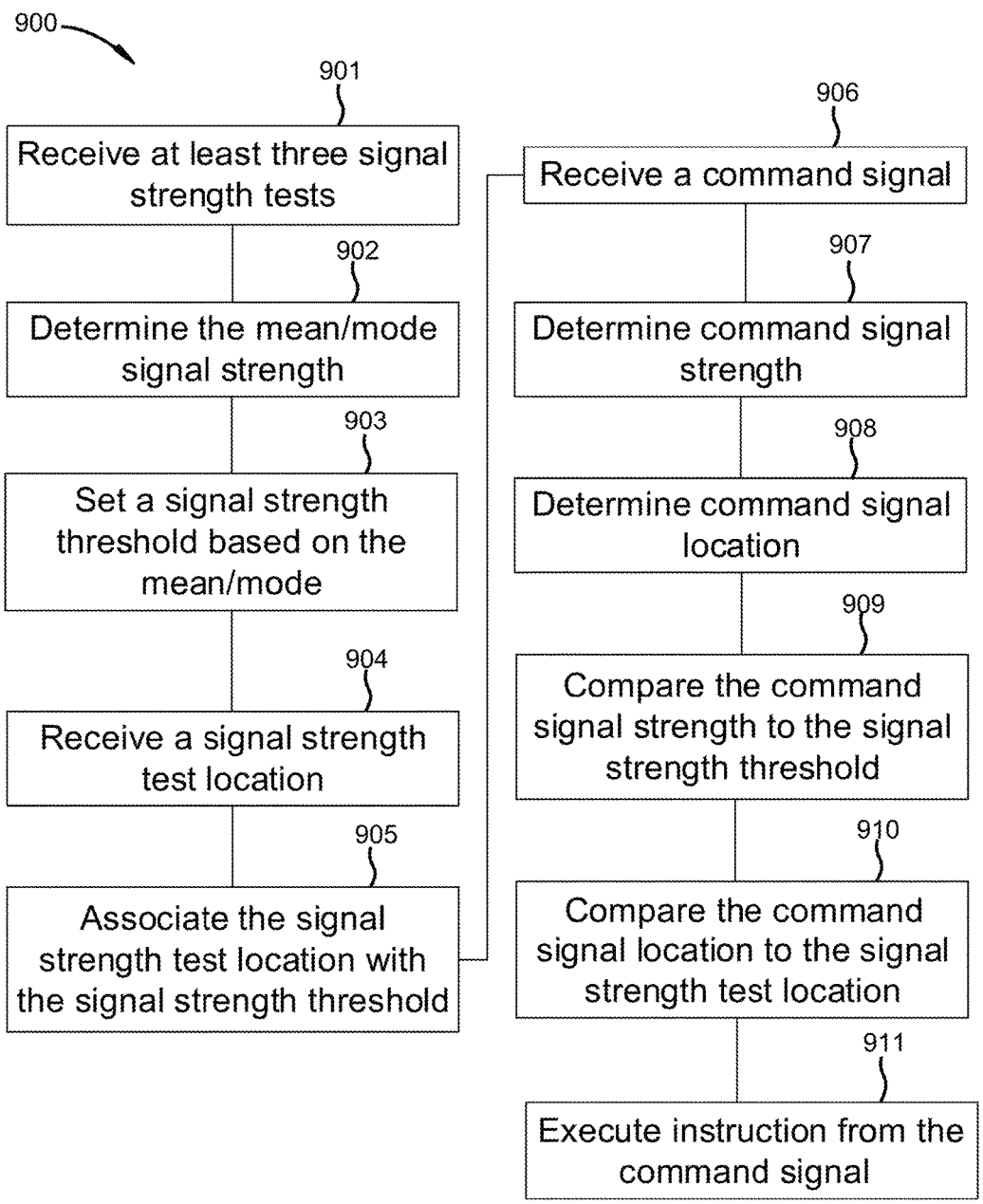
FIG. 9 depicts a method of executing a command sent from a line-of-sight.

Referring to FIG. 9, a method of executing a command sent from a line-of-sight is depicted. The method 900 includes, at block 901, receiving at least three signal strength test signals at irregular intervals over a time span ranging from five seconds to five minutes. At block 902, the method 900 includes determining one or more of a mean signal strength and a mode signal strength of the signal strength test signals. At block 903, the method 900 includes setting a signal strength threshold based on one or more of the mean signal strength and a mode signal strength. At block 904, the method 900 includes receiving a signal strength test signal location from which the signal strength test signals were sent. At block 905, the method 900 includes associating the signal strength test signal location with the signal strength threshold. At block 906, the method 900 includes receiving a command signal from a remote control device. At block 907, the method 900 includes determining a command signal strength. At block 908, a command signal location is determined from which the command signal was sent. At block 909, the command signal strength is compared to the signal strength threshold. At block 910, the command signal location is compared to the signal strength test signal location. At block 911, the instructions delivered by the command signal are executed as the command signal strength exceeds the signal strength threshold.

Figure 10:
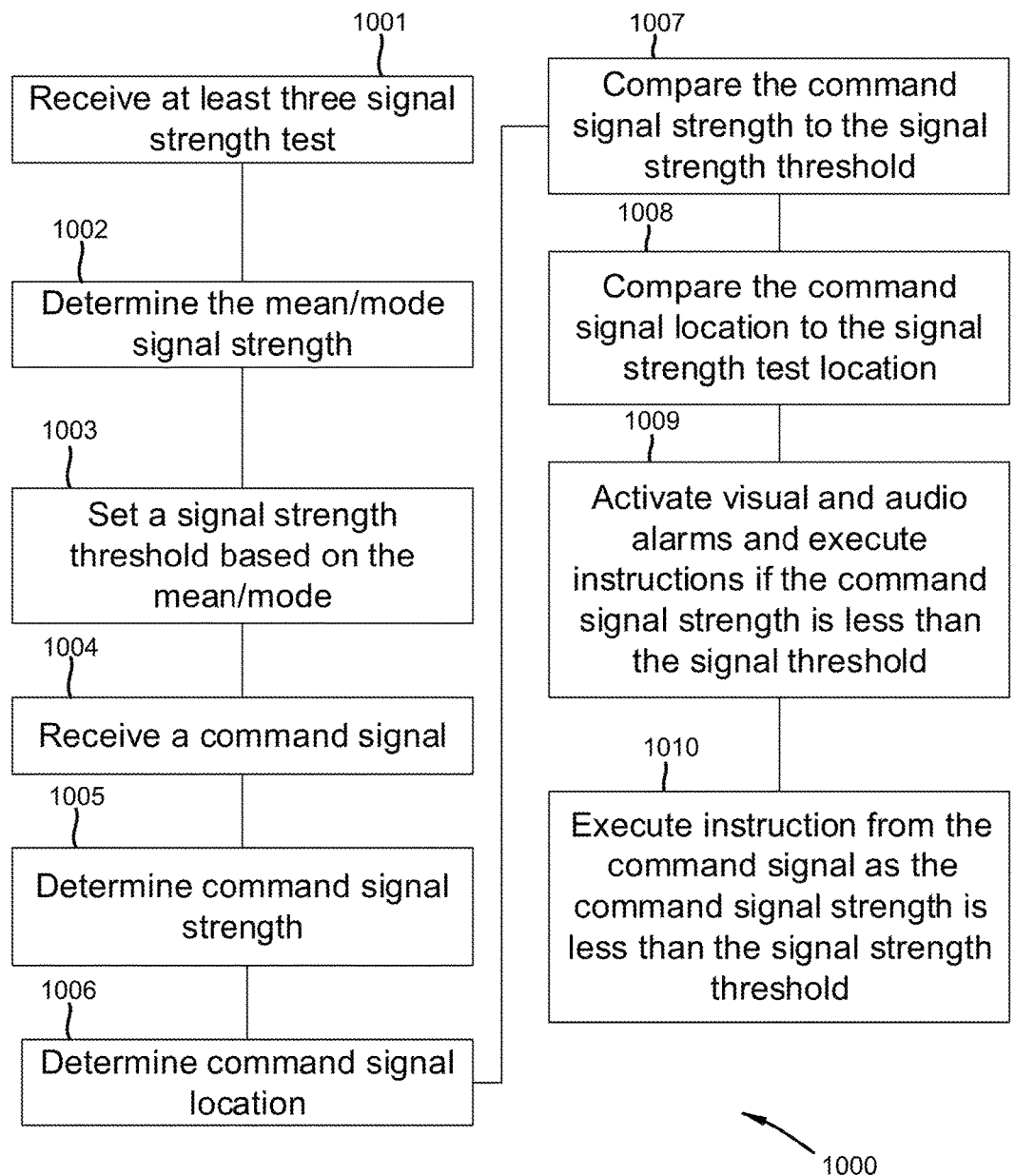
FIG. 10 depicts a method of executing a command sent from outside a line-of-sight.

Referring to FIG. 10, a method of executing a command sent from outside a line-of-sight is depicted. The method 1000 includes, at block 1001, receiving at least three signal strength test signals at irregular intervals over a time span ranging from five seconds to five minutes. At block 1002, the method 1000 includes determining one or more of a mean signal strength and a mode signal strength of the signal strength test signals. At block 1003, the method 1000 includes setting a signal strength threshold based on one or more of the mean signal strength and a mode signal strength. At block 1004, the method 1000 includes receiving a command signal from a remote control device. At block 1005, the method 1000 includes determining a command signal strength. At block 1006, a command signal location is determined from which the command signal was sent. At block 1007, the command signal strength is compared to the signal strength threshold. At block 1008, the command signal location is compared to the signal strength test signal location. At block 1009, one or more of a visual alarm and an audio alarm are activated. The alarms provide a warning notifying a person proximate the remotely actuatable device the device is being remotely controlled. At block 1010, the instructions delivered by the command signal are executed as the command signal strength exceeds the signal strength threshold.

Figure 11:
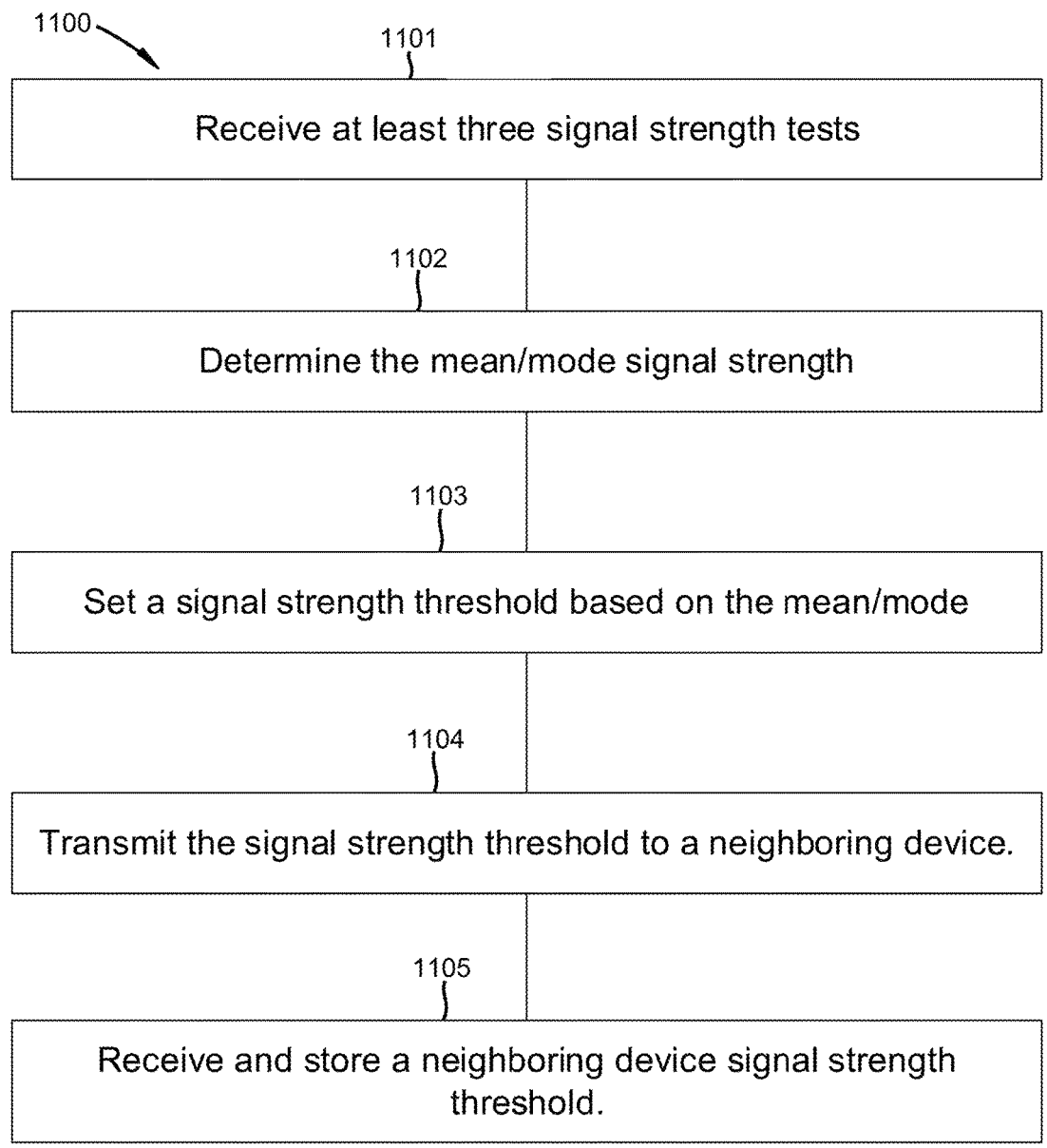
FIG. 11 depicts a method of sharing a signal strength threshold.

Referring to FIG. 11, a method of sharing a signal strength threshold is depicted. The method 1100 includes, at block 1101, receiving at least three signal strength test signals at irregular intervals over a time span ranging from five seconds to five minutes. At block 1102, the method 1100 includes determining one or more of a mean signal strength and a mode signal strength of the signal strength test signals. At block 1103, the method 1100 includes setting a signal strength threshold based on one or more of the mean signal strength and a mode signal strength. At block 1104, the signal strength threshold may be transmitted, the transmission designated for a neighboring device. At block 1105, a neighboring device signal strength threshold may be received and/or stored.

We claim:

1. A remotely actuatable device, comprising:
a mounting bracket comprising two opposing walls comprising opposed coaxial openings complimentary to two opposing walls comprising opposed coaxial openings of a mounting channel, wherein the mounting bracket is removably mounted within walls of the mounting channel using removable pins inserted through the respective coaxial openings;
an electronically actuatable component;
a communications module comprising one or more of a receiver and a transceiver; and
a controller that electronically communicates with one or more of the electronically actuatable component and the communications module, and that stores and executes instructions for a set-signal-strength-threshold mode, the instructions comprising:
receiving at least three signal strength test signals at irregular intervals over a time span ranging from five seconds to five minutes, each of the test signals including an indication the test signals were sent from an edge of a line-of-sight with the remotely actuatable device;
determining one or more of a mean signal strength and a mode signal strength of the signal strength test signals; and
setting a signal strength threshold based on one or more of the mean signal strength and a mode signal strength,
wherein, after setting the signal strength threshold, the controller differentiates between commands sent to the remotely actuatable device from within a line-of-sight and commands sent to the remotely actuatable device from outside the line-of-sight by the signal strength threshold.

2. The remotely actuatable device of claim 1, wherein the electronically actuatable component comprises a light, a speaker, a laser, a motor, a pump, a power relay, an artificial intelligence processor, a communications router, a battery, or combinations thereof each comprising the mounting bracket.

3. The remotely actuatable device of claim 1, wherein the communications module
comprises a short-range, 2.4-2.5 GHz transceiver, and wherein the set-signal-strength-threshold mode executes in a pairing mode of the short-range transceiver.

4. The remotely actuatable device of claim 3, wherein the pairing mode comprises an initial pairing mode between the remotely actuatable device and a remote control device.

5. The remotely actuatable device of claim 4, wherein the controller further stores
instructions for selecting the pairing mode, the instructions comprising: receiving a unique remote control device identifier;
comparing the identifier to a list of previously-paired device identifiers;
entering the initial pairing mode if the unique remote control device identifier does not match any of the previously-paired device identifiers; and
entering a normal pairing mode if the unique remote control device identifier matches at least one of the previously-paired device identifiers.

6. The remotely actuatable device of claim 4, wherein the controller further stores
instructions for selecting the pairing mode, the instructions comprising receiving an indicator that communicates to the controller directly whether the remote control device has previously paired with the electronically actuatable device.

7. The remotely actuatable device of claim 6, wherein the indicator comprises a true/false statement.

8. The remotely actuatable device of claim 4, wherein the remote control device comprises one or more of a smartphone or a tablet.

9. The remotely actuatable device of claim 1, wherein the signal strength test signals comprise one or more of a signal order identifier and a time before the next signal strength test signal.

10. The remotely actuatable device of claim 9, wherein the time before the next signal strength test signal is set to zero for a last signal strength test signal of the at least three signal strength test signals.

11. The remotely actuatable device of claim 1, wherein a last signal strength test signal of the at least three signal strength test signals comprises a last-test-signal identifier that directly indicates to the controller no further signal strength test signals will be received.

12. The remotely actuatable device of claim 1, wherein the controller stores two or more signal strength thresholds, each threshold corresponding to a break point in a line-of-sight with the remotely actuatable device.

13. The remotely actuatable device of claim 12, wherein the signal strength thresholds correspond to a GPS location of a remote control device that remotely controls the remotely actuatable device.

14. The remotely actuatable device of claim 1, further comprising at least two antennas electrically connected to the communications module.

15. The remotely actuatable device of claim 14, wherein the communications module comprises receivers, transmitters, transceivers, or combinations thereof, corresponding separately to each antenna.

16. The remotely actuatable device of claim 1, wherein the controller further stores and executes instructions comprising:
   receiving a signal strength test signal location from which the signal strength test signals were sent; and
   associating the signal strength test signal location with the signal strength threshold.

17. The remotely actuatable device of claim 16, wherein the controller further stores and executes instructions comprising:
   receiving a command signal; determining a command signal strength;
   determining a command signal location from which the command signal was sent;
   comparing the command signal strength to the signal strength threshold;
   comparing the command signal location to the signal strength test signal location; and
   executing instructions delivered by the command signal as the command signal strength exceeds the signal strength threshold.

18. The remotely actuatable device of claim 16, further comprising one or more of a visual alarm comprising one or more lights and an audio alarm comprising one or more speakers.

19. The remotely actuatable device of claim 18, wherein the controller further stores and executes instructions comprising:
   receiving a command signal;
   determining a command signal strength;
   determining a command signal location from which the command signal was sent;
   comparing the command signal strength to the signal strength threshold;
   comparing the command signal location to the signal strength test signal location;
   activating one or more of the visual alarm and the audio alarm; and
   executing instructions delivered by the command signal as the command signal strength is less than the signal strength threshold.

20. The remotely actuatable device of claim 1, wherein the electronically actuatable component communicates with the controller through a network selected from the group consisting of the Internet, a local area network, a wide area network, a cloud based network, and/or a wireless network.

* * * * *